US011967749B2

(12) United States Patent
Park et al.

(10) Patent No.: US 11,967,749 B2
(45) Date of Patent: Apr. 23, 2024

(54) CAVITY FILTER AND CONNECTING STRUCTURE INCLUDED THEREIN

(71) Applicant: KMW INC., Hwaseong-si (KR)

(72) Inventors: Nam Shin Park, Hwaseong-si (KR); Joung Hoe Kim, Hwaseong-si (KR); Sung Ho Jang, Yongin-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 17/974,645

(22) Filed: Oct. 27, 2022

(65) Prior Publication Data

US 2023/0045912 A1 Feb. 16, 2023

Related U.S. Application Data

(63) Continuation of application No. 17/120,060, filed on Dec. 11, 2020, now Pat. No. 11,495,870, which is a (Continued)

(30) Foreign Application Priority Data

Jun. 12, 2018 (KR) ........................ 10-2018-0067399
Jun. 12, 2019 (KR) ........................ 10-2019-0069126

(51) Int. Cl.
*H01P 1/208* (2006.01)
*H01P 1/213* (2006.01)
*H01R 13/24* (2006.01)

(52) U.S. Cl.
CPC .......... *H01P 1/2088* (2013.01); *H01P 1/2138* (2013.01); *H01R 13/2421* (2013.01)

(58) Field of Classification Search
CPC ........ H01P 1/2088; H01P 1/2138; H01P 7/04; H01R 13/2421; H01R 13/2457
See application file for complete search history.

(56) References Cited

U.S. PATENT DOCUMENTS 5,329,262 A 7/1994 Fisher, Jr.
9,627,732 B2 * 4/2017 Lee ........................ H01P 1/207
(Continued)

FOREIGN PATENT DOCUMENTS

CN 102136616 A 7/2011
CN 104321938 A 1/2015
(Continued)

OTHER PUBLICATIONS

International Search Report for PCT/KR2019/007082 dated Sep. 20, 2019 and its English translation.
(Continued)

*Primary Examiner* — Andrea Lindgren Baltzell
*Assistant Examiner* — Kimberly E Glenn
(74) *Attorney, Agent, or Firm* — Insight Law Group, PLLC

(57) ABSTRACT

The present invention relates to a cavity filter and a connecting structure included therein. The cavity filter includes: an RF signal connecting portion spaced apart, by a predetermined distance, from an outer member having an electrode pad provided on a surface thereof; and a terminal portion configured to electrically connect the electrode pad of the outer member and the RF signal connecting portion so as to absorb assembly tolerance existing at the predetermined distance and to prevent disconnection of the electric flow between the electrode pad and the RF signal connecting portion, wherein the terminal portion includes: a first side terminal contacted with the electrode pad; and a second side terminal having a housing space in which a part of the first side terminal is housed, and connected to the RF signal connecting portion, wherein the first side terminal is provided as an elastic deformable body whose part is radially widened or narrowed against an assembly force provided by an assembler. Therefore, the cavity filter can efficiently
(Continued)

absorb assembly tolerance which occurs through assembly design, and prevent disconnection of an electric flow, thereby preventing degradation in performance of an antenna device.

11 Claims, 25 Drawing Sheets

Related U.S. Application Data continuation of application No. PCT/KR2019/007082, filed on Jun. 12, 2019.

(56) References Cited

U.S. PATENT DOCUMENTS

| | | | | |
|---|---|---|---|---|
| 11,612,087 | B2 * | 3/2023 | Kim | H04B 1/40 |
| 2003/0155989 | A1 | 8/2003 | Ling et al. | |
| 2007/0241843 | A1 | 10/2007 | D'Ostilio | |
| 2008/0258848 | A1 | 10/2008 | Quan et al. | |
| 2010/0233903 | A1 | 9/2010 | Islam | |
| 2011/0312215 | A1 | 12/2011 | Uesaka et al. | |
| 2017/0256873 | A1 | 9/2017 | Knop | |
| 2017/0310005 | A1 | 10/2017 | Kang et al. | |
| 2018/0131153 | A1 | 5/2018 | Flaherty, IV | |
| 2021/0328333 | A1 | 10/2021 | Ma et al. | |

FOREIGN PATENT DOCUMENTS

| | | | |
|---|---|---|---|
| CN | 204243344 | U | 4/2015 |
| CN | 204424413 | U | 6/2015 |
| CN | 106057771 | A | 10/2016 |
| CN | 108448213 | A | 8/2018 |
| CN | 210805970 | U | 6/2020 |
| EP | 3306757 | A1 | 4/2018 |
| JP | 2007-006529 | A | 1/2007 |
| JP | 2014-013730 | A | 1/2014 |
| KR | 10-2010-0001571 | A | 1/2010 |
| KR | 10-2011-0041919 | A | 4/2011 |
| WO | 2009/051183 | A1 | 4/2009 |
| WO | 2012/122142 | A2 | 9/2012 |
| WO | 2018/093176 | A2 | 5/2018 |
| WO | 2020075968 | A1 | 4/2020 |

OTHER PUBLICATIONS

First office action dated Aug. 31, 2021 from the Chinese Patent Office for Chinese Application No. 201980040096.5.

Extended European search report dated Feb. 14, 2022 for European Application No. 19818581.1.

Japanese office action dated Feb. 1, 2022 for Japanese Application No. 2020-568990.

Non-final office action dated Dec. 17, 2021 for U.S. Appl. No. 17/120,060.

Notice of Allowance dated Jul. 5, 2022 for U.S. Appl. No. 17/120,060.

Non-final Office Action dated Sep. 12, 2023 from the Japanese Patent Office for Japanese Application No. 2022-141845.

* cited by examiner

CAVITY FILTER AND CONNECTING STRUCTURE INCLUDED THEREIN

CROSS-REFERENCE TO RELATED APPLICATIONS

This application is a Continuation Application of U.S. application Ser. No. 17/120,060, filed on Dec. 11, 2020 (now pending), which is a Continuation Application of International Application No. PCT/KR2019/007082, filed on Jun. 12, 2019, which claims priority and benefits of Korean Application Nos. 10-2018-0067399, filed on Jun. 12, 2018, and 10-2019-0069126, filed on Jun. 12, 2019, the disclosures of which are incorporated herein by reference in their entirety.

TECHNICAL FIELD

The present invention relates to a cavity filter and a connecting structure included therein, and more particularly, to a cavity filter for a massive MIMO (Multiple-Input Multiple-Output) antenna, which improves a connector fastening structure between a filter and a PCB (Printed Circuit Board) in consideration of assembly performance and size, and a connecting structure included therein.

BACKGROUND ART

The contents described in this section simply provide background information on the present disclosure, and do not constitute the related art.

MIMO (Multiple Input Multiple Output) refers to a technology capable of significantly increasing a data transmission capacity by using a plurality of antennas, and is a spatial multiplexing technique in which a transmitter transmits different data through respective transmitting antennas and a receiver sorts the transmitted data through a suitable signal processing operation. Therefore, when the number of transmitting antennas and the number of receiving antennas are increased at the same time, the channel capacity may be raised to transmit more data. For example, when the number of antennas is increased to 10, it is possible to secure a channel capacity ten times larger than in a current single antenna system, even though the same frequency band is used.

In the 4G LTE-advanced technology, 8 antennas are used. According to the current pre-5G technology, a product having 64 or 128 antennas mounted therein is being developed. When the 5G technology is commercialized, it is expected that base station equipment with much more antennas will be used. This technology is referred to as massive MIMO. Currently, cells are operated in a 2D manner. However, when the massive MIMO technology is introduced, 3D-beamforming becomes possible. Thus, the massive MIMO technology is also referred to as FD (Full Dimension)-MIMO.

According to the massive MIMO technology, the numbers of transceivers and filters are increased with the increase in number of antennas. As of 2014, 200,000 or more base stations are installed in Korea. That is, there is a need for a cavity filter structure which is easily mounted while minimizing a mounting space. Furthermore, there is a need for an RF signal line connecting structure which provides the same filter characteristic even after individually tuned cavity filters are mounted in antennas.

An RF filter having a cavity structure includes a resonator provided in a box structure formed of a metallic conductor, the resonator being configured as a resonant bar or the like. Thus, the RF filter has only a natural frequency of electromagnetic field to transmit only a specific frequency, e.g. an ultra-high frequency, through resonance. A band pass filter with such a cavity structure has a low insertion loss and high power. Thus, the band pass filter is utilized in various manners as a filter for a mobile communication base station antenna.

DISCLOSURE

Technical Problem

An object of the present invention is to provide a cavity filter which has a slimmer and more compact structure and includes an RF connector embedded in a filter body in a thickness direction thereof, and a connecting structure included therein.

Another object of the present invention is to provide a cavity filter which is assembled through an assembly method capable of minimizing the accumulation amount of assembly tolerance which occurs when a plurality of filters are assembled, and has an RF signal connection structure that can facilitate mounting and uniformly maintain the frequency characteristics of the filters, and a connecting structure included therein.

Still another object of the present disclosure is to provide a cavity filter which can prevent a signal loss by applying lateral tension while allowing a relative motion in the case of a separable RF pin, and a connecting structure therein.

Yet another object of the present disclosure is to provide a cavity filter which can maintain a constant contact area between two members to be electrically connected to each other, while absorbing assembly tolerance between the two members, and be installed through a clear and simple method, and a connecting structure included therein.

The technical problems of the present disclosure are not limited to the above-described technical problems, and other technical problems which are not mentioned can be clearly understood by the person skilled in the art from the following descriptions.

Technical Solution

In one general aspect, a cavity filter includes: an RF signal connecting portion spaced apart, by a predetermined distance, from an outer member having an electrode pad provided on a surface thereof; and a terminal portion configured to electrically connect the electrode pad of the outer member and the RF signal connecting portion so as to absorb assembly tolerance existing at the predetermined distance and to prevent disconnection of the electric flow between the electrode pad and the RF signal connecting portion, wherein the terminal portion includes: a first side terminal contacted with the electrode pad; and a second side terminal having a housing space in which a part of the first side terminal is housed, and connected to the RF signal connecting portion, wherein the first side terminal is provided as an elastic deformable body whose part is radially widened or narrowed against an assembly force provided by an assembler.

The terminal portion may be inserted into a terminal insertion port formed in a filter body having the RF signal connecting portion provided therein.

The cavity filter may further include a dielectric body inserted into the terminal insertion port so as to cover the outside of the terminal portion.

The dielectric body may have a terminal through-hole through which the terminal portion passes, and any one of the first side terminal and the second side terminal, which passes through the terminal through-hole, may include a locking portion which has a larger diameter than the terminal through-hole so as to be locked to the dielectric body.

The first side terminal may be provided as a washer spring having a contact portion integrated therewith, the contact portion being contacted with the electrode pad.

The cavity filter may further include an elastic member housed in the housing space of the second side terminal, and configured to elastically support the first side terminal toward the electrode pad.

The first side terminal may include: a locking support plate locked to the inside of the housing space of the second side terminal; and an upper protrusion extended from the top of the locking support plate, and contacted with the electrode pad.

The elastic member may be provided as a washer spring which elastically supports the bottom of the locking support plate of the first side terminal.

The first side terminal may include: a lower protrusion housed in the housing space of the second side terminal, and inserted into a terminal guide hole formed in the housing space of the second side terminal; and an upper protrusion extended from the top of the lower protrusion and contacted with the electrode pad.

The elastic member may be provided as a washer spring locked to a locking rib formed between the upper protrusion and the lower protrusion of the first side terminal, and configured to elastically support the first side terminal toward the electrode pad.

In another general aspect, a connecting structure includes: an RF signal connecting portion spaced apart, by a predetermined distance, from an outer member having an electrode pad provided on a surface thereof; and a terminal portion configured to electrically connect the electrode pad of the outer member and the RF signal connecting portion so as to absorb assembly tolerance existing at the predetermined distance and to prevent disconnection of the electric flow between the electrode pad and the RF signal connecting portion, wherein the terminal portion includes: a first side terminal contacted with the electrode pad; and a second side terminal having a housing space in which a part of the first side terminal is housed, and connected to the RF signal connecting portion, wherein the first side terminal is provided as an elastic deformable body whose part is radially widened or narrowed against an assembly force provided by an assembler.

Advantageous Effects

In accordance with the embodiments of the present disclosure, the cavity filter may have a slimmer and more compact structure because the RF connector is embedded in the filter body in the thickness direction thereof, be assembled through an assembly method capable of minimizing the accumulation amount of assembly tolerance which occurs when a plurality of filters are assembled, facilitate the RF signal connection structure to be easily mounted and uniformly maintain the frequency characteristics of the filters, and provide stable connection by applying lateral tension while allowing a relative motion, thereby preventing degradation in antenna performance.

BEST MODE

Figure 1:
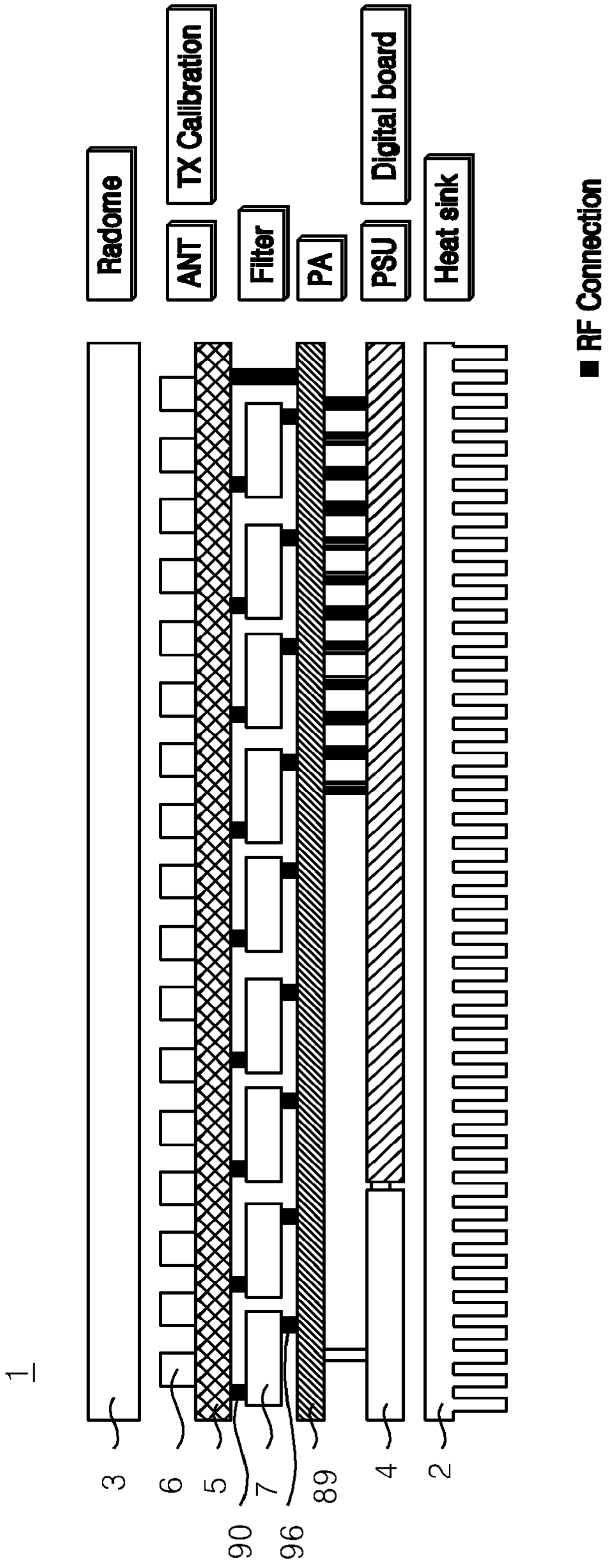
FIG. 1 is a diagram schematically illustrating a stacked structure of a massive MIMO antenna.

Hereafter, some embodiments of the present disclosure will be described in detail with reference to the accompanying drawings. It should be noted that, when components in each of the drawings are denoted by reference numerals, the same components are represented by like reference numerals, even though the components are displayed on different drawings. Furthermore, when it is determined that the detailed descriptions of publicly known components or functions related to the present disclosure disturb understandings of the embodiments of the present disclosure, the detailed descriptions thereof will be omitted herein.

When the components of the embodiments of the present disclosure are described, the terms such as first, second, A, B, (a) and (b) may be used. Each of such terms is only used to distinguish the corresponding component from other components, and the nature or order of the corresponding component is not limited by the term. Furthermore, all terms used herein, which include technical or scientific terms, may have the same meanings as those understood by those skilled in the art to which the present disclosure pertains, as long as the terms are not differently defined. The terms defined in a generally used dictionary should be analyzed to have meanings which coincide with contextual meanings in the related art. As long as the terms are not clearly defined in this specification, the terms are not analyzed as ideal or excessively formal meanings.

FIG. 1 is a diagram schematically illustrating a stacked structure of a massive MIMO antenna.

FIG. 1 only illustrates an exemplary exterior of an antenna device 1 in which an antenna assembly including a cavity filter in accordance with an embodiment of the present disclosure is embedded, and does not limit the exterior of the antenna device 1 when components are actually stacked.

The antenna device 1 includes a housing 2 having a heat sink formed therein and a radome 3 coupled to the housing 2. Between the housing 2 and the radome 3, an antenna assembly may be embedded.

A PSU (Power Supply Unit) 4 is coupled to the bottom of the housing 2 through a docking structure, for example, and provides operation power for operating communication parts included in the antenna assembly.

Typically, the antenna assembly has a structure in which an equal number of cavity filters 7 to the number of antennas are disposed on a rear surface of an antenna board having a plurality of antenna elements 6 arranged on a front surface thereof, and a related PCB 8 is subsequently stacked. The cavity filters 7 may be thoroughly tuned and verified to individually have frequency characteristics suitable for the specification, and prepared before mounted on the antenna board 5. Such a tuning and verifying process may be rapidly performed in an environment with the same characteristics as the mounting state.

Figure 2:
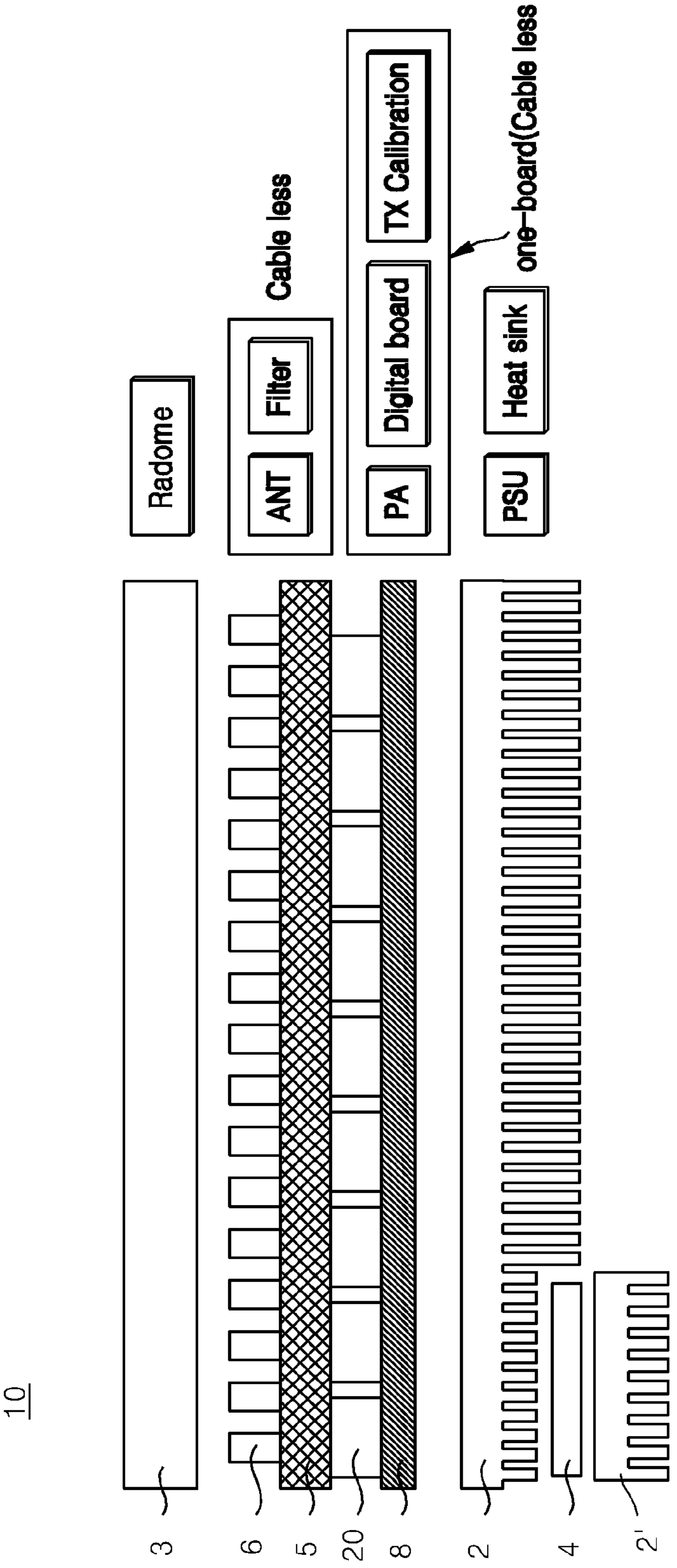
FIG. 2 is a cross-sectional view illustrating that a cavity filter in accordance with an embodiment of the present disclosure is stacked between an antenna board and a control board.

FIG. 2 is a cross-sectional view illustrating that a cavity filter in accordance with an embodiment of the present disclosure is stacked between an antenna board and a control board.

Referring to FIG. 2, a cavity filter 20 in accordance with the embodiment of the present disclosure may exclude the typical RF connector 90 illustrated in FIG. 1, which makes it possible to provide an antenna structure having a lower height profile while facilitating connection.

Furthermore, an RF connecting portion is disposed on either surface of the cavity filter 20 in the height direction thereof, and connected to the cavity filter 20 in accordance with the embodiment of the present disclosure. Although an antenna board 5 or a PCB board 8 is vibrated or thermally deformed, the RF connection may be equally maintained without a change in frequency characteristic.

Figure 3:
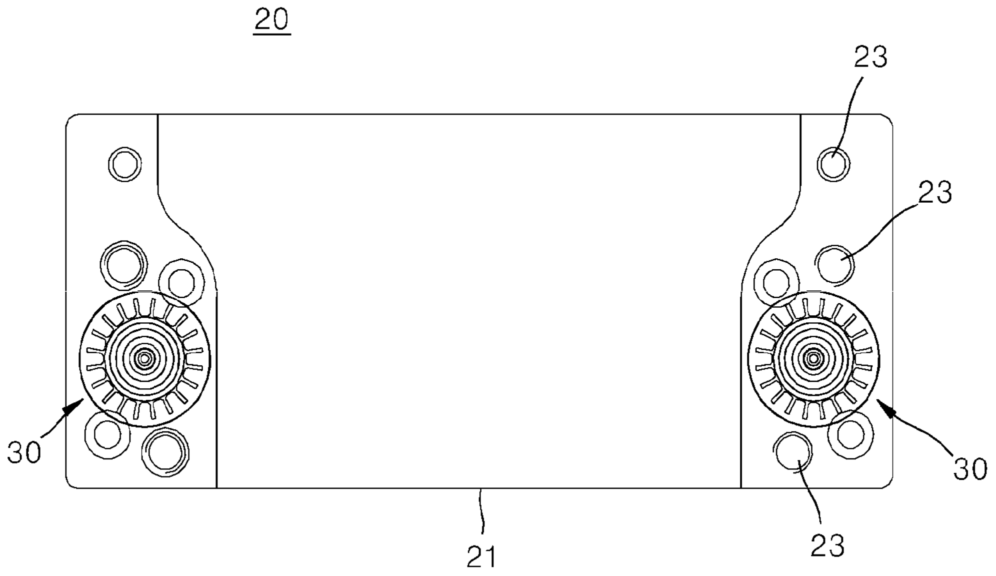
FIG. 3 is a plan perspective view of the structure of the cavity filter in accordance with the embodiment of the present disclosure, when seen from the bottom.

FIG. 3 is a plan perspective view of the structure of the cavity filter in accordance with the embodiment of the present disclosure, when seen from the bottom.

Referring to FIG. 3, the cavity filter 20 in accordance with the embodiment of the present disclosure includes an RF signal connecting portion (see reference numeral 31 in FIG. 4 and the following drawings), a first case (with no reference numeral) having a hollow space therein, a second case (with no reference numeral) covering the first case, a terminal portion (see reference numeral 40 in FIG. 4) formed on either side of the first case in the longitudinal direction thereof and disposed in the height direction of the cavity filter 20, and a filter module 30 including assembly holes 23 formed on both sides of the terminal portion 40. The terminal portion 40 electrically connects an electrode pad (with no reference numeral) of an outer member 8, for example, an antenna board or PCB board to the RF signal connecting portion 31 through a terminal insertion port 25 formed in the first case.

When the bottom of the terminal portion 40 in the drawings is supported by the RF signal connecting portion 31 and the antenna board or PCB board 8 is closely coupled to the top of the terminal portion 40, the terminal portion 40 may be electrically supported while always contacted with the electrode pad formed on one surface of the outer member 8, thereby removing assembly tolerance existing in the terminal insertion port 25.

That is, as will be described below, the terminal portion 40 of the cavity filter 20 in accordance with the embodiment of the present disclosure may be separated as first side terminal and the second side terminal and implemented as various embodiments depending on a shape for applying lateral tension and a specific configuration for absorbing assembly tolerance.

Figure 4:
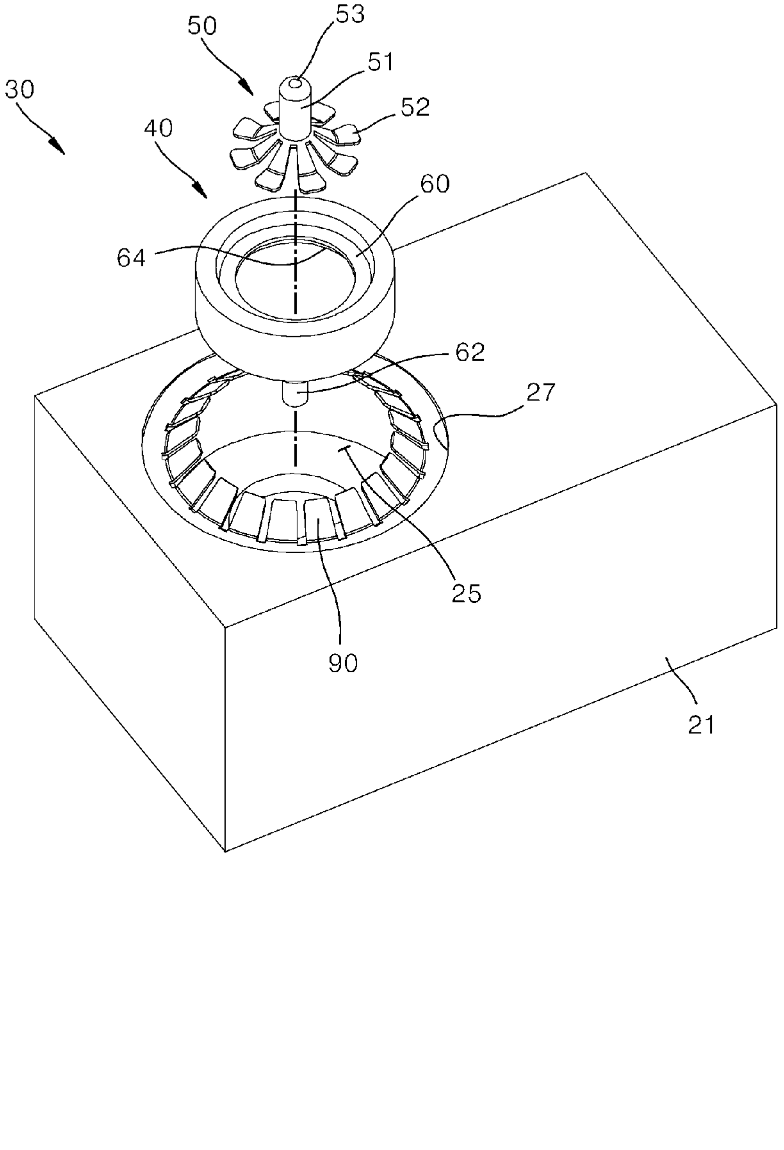
FIG. 4 is an exploded perspective view illustrating some components of a cavity filter in accordance with a first embodiment of the present disclosure.

More specifically, the terminal portion 40 may be provided as a separable terminal portion in which two members are separated into an upper portion and a lower portion as illustrated in FIG. 4, and a part of any one member of the two members is inserted into a part of the other member.

Although not illustrated, when the cavity filter is provided as an integrated filter, the terminal portion 40 may be provided as an elastic body whose part is elastically deformed when a predetermined assembly force is supplied by an assembler, in order to absorb assembly tolerance. However, the integrated filter having the terminal portion 40 integrated therewith does not require a separate shape design for applying lateral tension, because it is not predicted that an electric flow from one end to the other end thereof will be disconnected.

However, when the terminal portion 40 is provided as a separable filter separated into two members, a separate elastic member 80 may be provided to remove the assembly tolerance. Specifically, the whole length of the terminal portion 40 may be decreased while the predetermined assembly force moves a first side terminal 50 and the second side terminal 60, which are separated from each other, to overlap each other, and increased and restored to the original state when the assembly force is removed. However, since the first side terminal 50 and the second side terminal 60 of the terminal portion 40 are separated from each other, it is feared that an electric flow will be disconnected when the first side terminal 50 and the second side terminal 60 are moved to overlap each other. Therefore, any one of the first side terminal 50 and the second side terminal 60 may be provided as an elastic deformable body, or a separate shape change for applying lateral tension may be essentially required.

Particularly, in the cavity filter 20 in accordance with the embodiment of the present disclosure, the first side terminal 50 may be provided as an elastic deformable body whose part is radially widened or narrowed against an assembly force provided by an assembler, thereby applying the above-described lateral tension. Furthermore, the elastic deformable body of the first side terminal 50 may be radially widened or narrowed to prevent a degradation in contact rate with the electrode pad of the outer member 8 provided as any one of an antenna board and a PCB board.

The term 'lateral tension' may be defined as a force which any one of the first side terminal 50 and the second side terminal 60 transfers to the other in a direction different from the longitudinal direction, in order to prevent the disconnection of the electric flow between the first side terminal 50 and the second side terminal 60, as described above.

The antenna device is characterized in that, when the shape change of the terminal portion 40 is designed, impedance matching design in the terminal insertion port 25 needs to be paralleled. However, the embodiments of the cavity filter 20 in accordance with the present disclosure will be described under the supposition that impedance matching is achieved in the terminal insertion port 25. Therefore, among the components of the embodiments of the cavity filter in accordance with the present disclosure, which will be described with reference to FIG. 4 and the following drawings, the exterior of a reinforcement plate or dielectric body inserted into the terminal insertion port 25 with the terminal portion 40 may have a different shape depending on impedance matching design.

Figure 5:
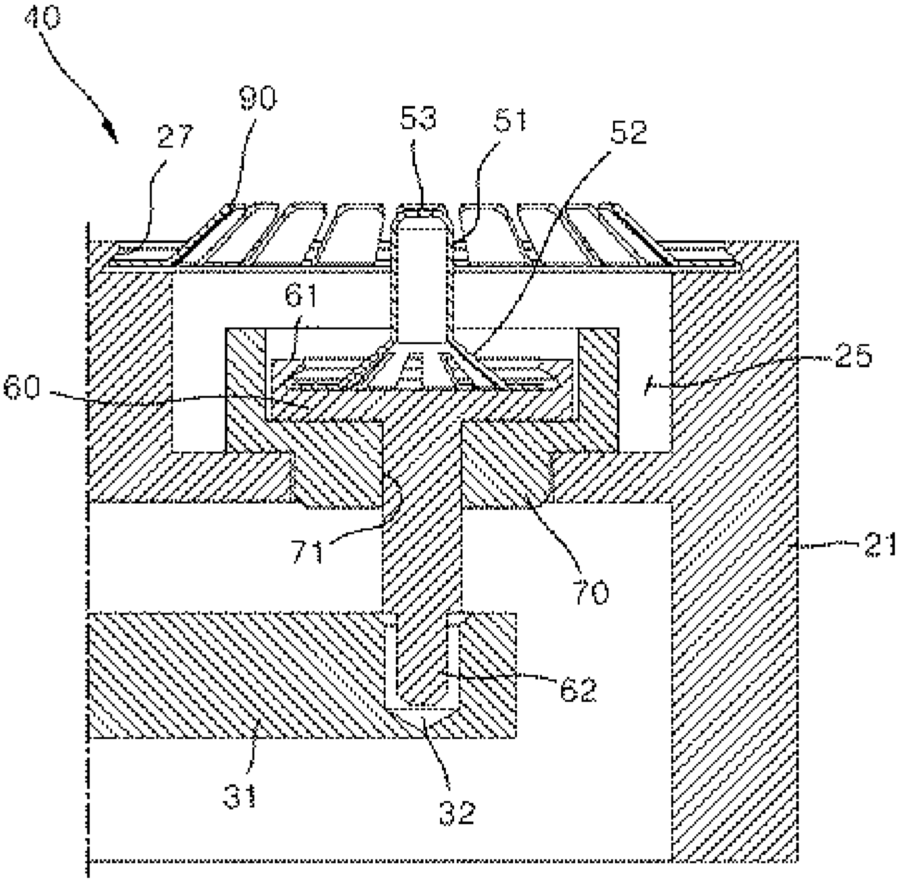
FIG. 5 is a cross-sectional view illustrating the cavity filter in accordance with the first embodiment of the present disclosure.
Figure 6:
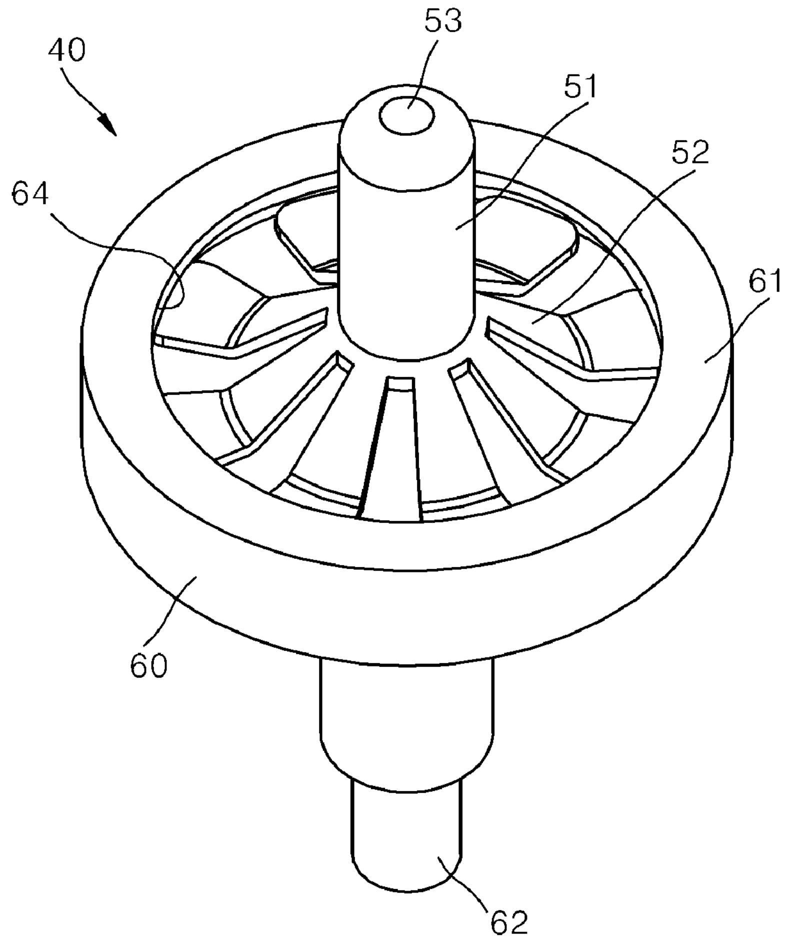
FIG. 6 is a perspective view illustrating a terminal portion among the components of FIG. 4.

FIG. 4 is an exploded perspective view illustrating some components of a cavity filter in accordance with a first embodiment of the present disclosure, FIG. 5 is a cross-sectional view illustrating the cavity filter in accordance with the first embodiment of the present disclosure, and FIG. 6 is a perspective view illustrating a terminal portion among the components of FIG. 4.

As illustrated in FIGS. 4 to 6, a cavity filter 20 in accordance with the first embodiment of the present disclosure includes an RF signal connecting portion 31 and a terminal portion 40. The RF signal connecting portion 31 is spaced apart, by a predetermined distance, from one surface of an outer member 8, for example, an electrode pad provided on the outer member 8. The terminal portion 40 may electrically connect the electrode pad of the outer member 8 to the RF signal connecting portion 31, and not only absorb assembly tolerance existing at the predetermined distance, but also prevent disconnection of the electric flow between the electrode pad and the RF signal connecting portion 31.

As described above, the outer member 8 may be commonly referred to as any one of an antenna board having antenna elements arranged on the other surface thereof and a PCB board provided as one board on which a PA (Power Amplifier), a digital board and TX calibration are integrated.

Hereafter, as illustrated in FIG. 3, an exterior configuration constituting the embodiments of the cavity filter 20 in accordance with the present disclosure is not divided into first and second cases, but commonly referred to as a filter body 21 having a terminal insertion port 25 formed therein.

As illustrated in FIGS. 4 and 5, the terminal insertion port 25 of the filter body 21 may be provided as a hollow space. The terminal insertion port 25 may be formed in different shapes depending on impedance matching design applied to a plurality of embodiments which will be described below.

The filter body 21 may have a washer installation portion 27 formed as a groove on one surface thereof on which the first side terminal 50 of the terminal portion 40 to be described below is provided. The washer installation portion 27 may be formed as a groove to have a larger inner diameter than the terminal insertion port 25. Thus, when the outer edge of a star washer 90 which will be described below is locked to the washer installation portion 27, the star washer 90 may be prevented from being separated upward.

Furthermore, the cavity filter 20 in accordance with the first embodiment of the present disclosure may further include the star washer 90 fixedly installed on the washer installation portion 27.

The following descriptions are based on the supposition that the star washer 90 is commonly provided in all the embodiments of the present disclosure, which will be described below, as well as the first embodiment of the present disclosure. Therefore, it should be understood that, although the star washer 90 is not described in detail in the embodiments other than the first embodiment, the star washer 90 is included in the embodiments.

The star washer 90 may include a fixed edge 91 which is formed in a ring shape and fixed to the washer installation portion 27, and a plurality of support pieces 92 which are upwardly inclined from the fixed edge 91 toward the center of the electrode pad of the antenna board or PCB board 8.

When the embodiments of the cavity filter 20 in accordance with the present disclosure are assembled to the antenna board or PCB board 8 by an assembler, the star washer 90 may apply an elastic force to a fastening force by a fastening member (not illustrated) through the above-described assembling hole, while the plurality of support pieces 92 are supported on one surface of the antenna board or PCB board 8.

The applying of the elastic force through the plurality of support pieces 92 may make it possible to uniformly maintain a contact area with the electrode pad of the terminal portion 40.

Furthermore, the ring-shaped fixed edge 91 of the star washer 90 may be provided to cover the outside of the terminal portion 40 which is provided to transfer an electric signal, and serve as a kind of ground terminal.

Furthermore, the star washer 90 serves to absorb assembly tolerance existing between the antenna board or PCB board 8 in the embodiments of the cavity filter 20 in accordance with the present disclosure.

As described below, however, the assembly tolerance absorbed by the star washer 90 exists in the terminal insertion port 25, and is distinguished from assembly tolerance absorbed by the terminal portion 40. That is, the cavity filter in accordance with the embodiments of the present disclosure may be designed to absorb overall assembly tolerances at two or more locations through separate members during a single assembly process, and thus coupled more stably.

As illustrated in FIGS. 4 to 6, the terminal portion 40 in the cavity filter 20 in accordance with the first embodiment of the present disclosure may include first side terminal 50 and the second side terminal 60. The first side terminal 50 may be contacted with the electrode pad of the outer member 8, and the second side terminal 60 may be fixed to a solder hole 32 formed in a portion extended as the RF signal connection portion 31 in a plate shape.

Here, a lower end portion of the first side terminal 50 may be partially housed in the second side terminal 60. For this structure, an upper end portion of the second side terminal 60 may have a housing space which is recessed downward to house a part of the lower end portion of the first side terminal 50.

The first side terminal 50 may include a contact portion 53 formed at the tip of an upper end portion 51 and a spring terminal portion 52 which forms the lower end portion and is elastically deformed by an assembly force provided by an assembler.

The spring terminal portion 52 may be provided as a plurality of spring terminal portions which are radially extended and downwardly inclined from the bottom of the upper end portion 51 of the first side terminal 50 having the contact portion 53 formed thereon, and each have an edge locked and fixed to a spring installation groove 64 formed in the housing space of the second side terminal 60.

The first side terminal 50 having such a configuration is formed in such a shape that the upper end portion 51 and the spring terminal portion 52 are formed as one body. The upper end portion 51 serves as a rod-shaped contact terminal which is provided to be vertically moved in the terminal insertion port 25, and the spring terminal portion 52 serves as an elastic member which elastically supports the upper end portion 51 from the bottom to the top. Specifically, the spring terminal portion 52 may be provided as an elastic deformable body whose portions corresponding to the fixed edge of the above-described star washer 90 are separated from each other, and portions corresponding to the support pieces of the star washer 90 are integrated with the upper end portion 51 corresponding to the contact terminal.

Therefore, when an assembly force of an assembler is provided through the contact portion 53 of the first side terminal 50, the upper end portion 51 of the first side terminal 50 is pressed downward, and the spring terminal portions 52 are elastically deformed to be radially widened or narrowed against the assembly force of the assembler, thereby removing assembly tolerance existing in the terminal insertion port 25.

At this time, when the portions of the spring terminal portion 52, corresponding to the fixed edge of the star washer 90, are elastically deformed by the assembly force provided by the assembler, the corresponding portions of the spring terminal portion 52 may be expanded and moved toward the inner circumferential wall of the spring installation groove 64 formed in the housing space of the second side terminal 60.

As illustrated in FIGS. 4 and 5, the cavity filter 20 in accordance with the first embodiment of the present disclosure may further include a dielectric body 70 inserted for impedance matching design in the terminal insertion port 25 in the relationship with the terminal portion 40 provided in the terminal insertion port 25. The dielectric body 70 may have a terminal through-hole 71 through which a lower end portion 62 of the second side terminal 60 passes.

The dielectric body 70 may be formed of Teflon. However, the material of the dielectric body 70 is not limited to Teflon, but can be replaced with any materials as long as the materials have a dielectric constant at which impedance matching in the terminal insertion port 25 can be achieved.

Furthermore, the bottom edge of the dielectric body 70 is locked to an insertion port support portion 28 formed in the terminal insertion port 25, and thus supports the second side terminal 60 installed through the terminal through-hole 71. As a result, the dielectric body 70 serves to reinforce the RF signal connecting portion 31 to which the lower end portion 62 of the second side terminal 60 is soldered and fixed by an assembly force provided by an assembler.

The first side terminal 50 and the second side terminal 60 are both made of a conductive material through which electricity flows. Thus, although the terminal portion 40 disposed in the terminal insertion port 25 is divided into two or more terminals, the spring terminal portion 52 of the first side terminal 50 may be elastically deformed as long as the antenna board or PCB board 8 is pressed against the first side terminal 50 by an assembly force of an assembler, thereby preventing disconnection of an electric flow.

Hereafter, an assembly tolerance absorption process during an assembly process of the cavity filter 20 in accordance with the first embodiment of the present disclosure, which has the above-described configuration, will be described with reference to the accompanying drawings (specifically, FIG. 5).

First, as illustrated in FIG. 5, a predetermined fastening force is transferred to the cavity filter 20 in accordance with the first embodiment of the present disclosure through an operation of pressing the cavity filter 20 against one surface of the antenna board or PCB board 8 having an electrode pad provided thereon, and then fastening a fastening member (not illustrated) into the assembly hole. However, the cavity filter 20 does not necessarily need to be pressed against the one surface of the antenna board or PCB board 8. On the contrary, the one surface of the antenna board or PCB board 8 may be pressed against the cavity filters 20 arranged at predetermined intervals, in order to transfer an assembly force.

Then, as illustrated in FIG. 5, the distance between the antenna board or PCB board 8 and the cavity filter 20 in accordance with the first embodiment of the present disclosure may be decreased. Simultaneously, the support pieces 92 of the star washer 90 may be deformed by the above-described fastening force to primarily absorb assembly tolerance existing between the cavity filter 20 in accordance with the first embodiment of the present disclosure and the antenna board or PCB board 8.

Simultaneously, the spring terminal portions 52 of the first side terminal 50 of the terminal portion 40 are elastically deformed and pressed to secondarily absorb assembly tolerance existing in the terminal insertion port 25.

While the assembly force provided by the assembler is retained by the fastening member or the like, the spring terminal portions 52 may be pressed against the bottom surface of the housing space of the second side terminal 60, which makes it possible to prevent disconnection of the electric flow between the first side terminal 50 and the second side terminal 60.

Figure 7:
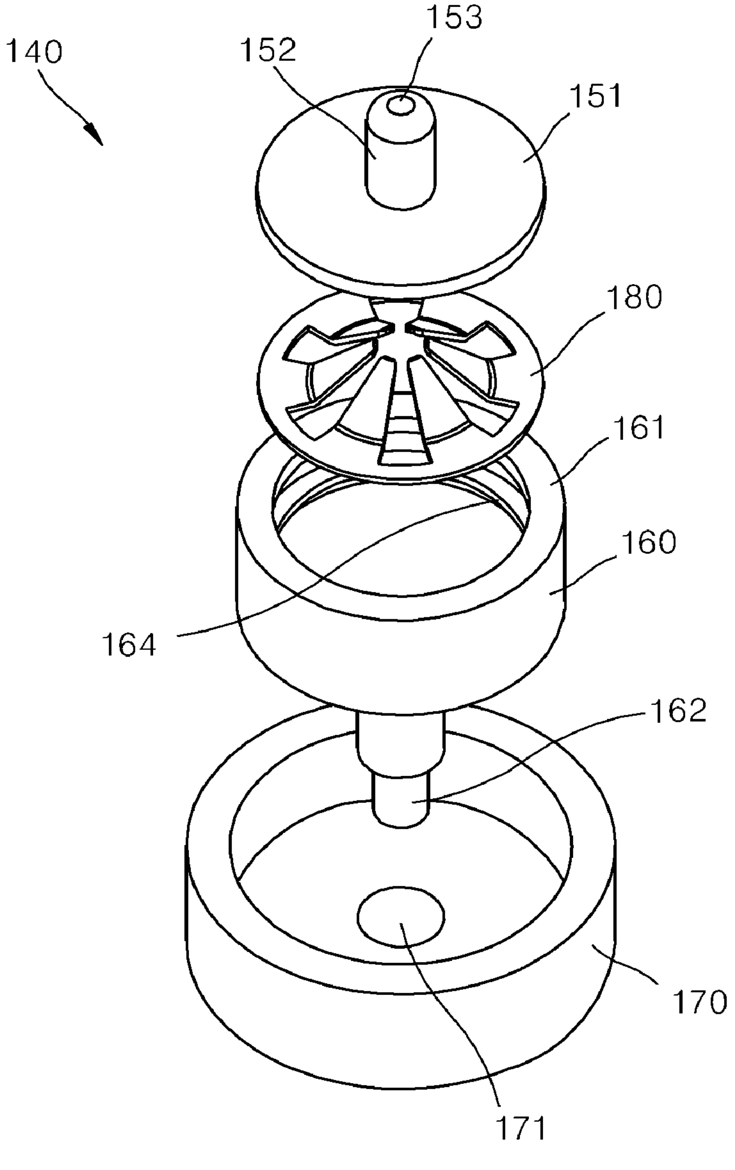
FIG. 7 is an exploded perspective view illustrating a cavity filter in accordance with a second embodiment of the present disclosure.
Figure 8:
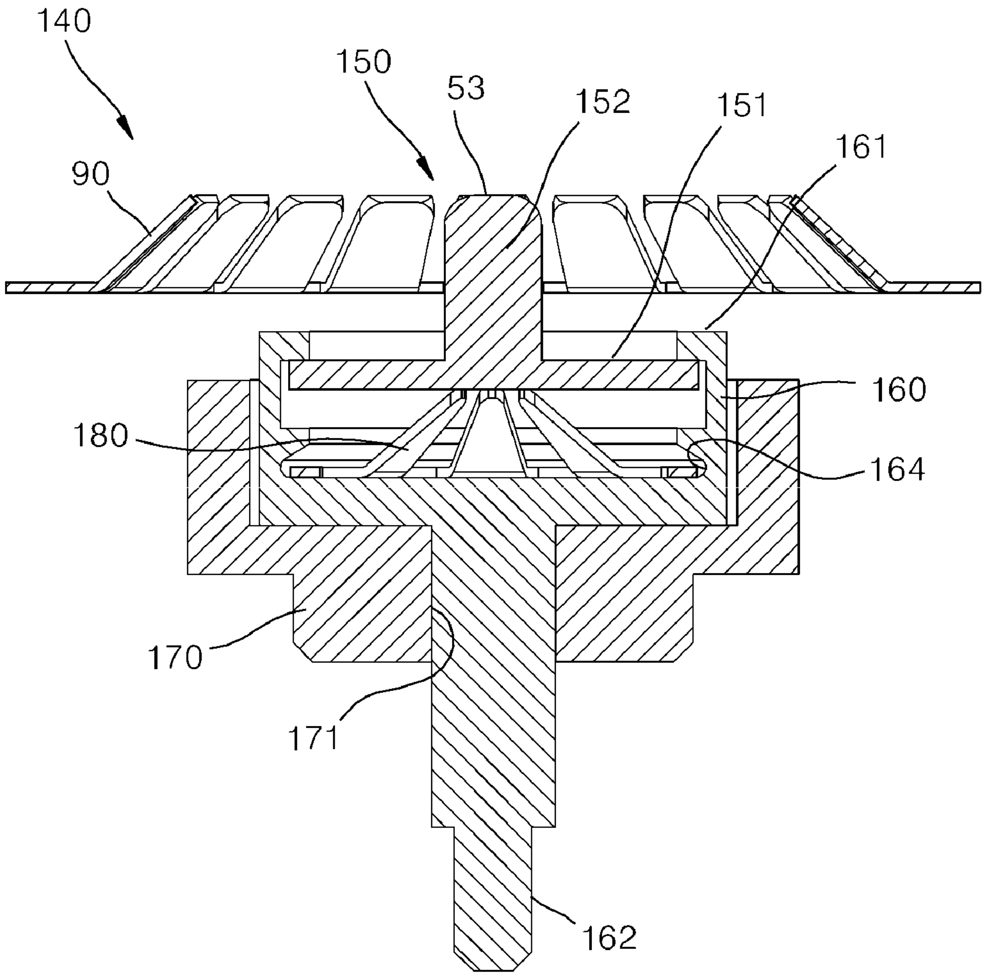
FIG. 8 is a cross-sectional view illustrating the cavity filter in accordance with the second embodiment of the present disclosure.
Figure 9:
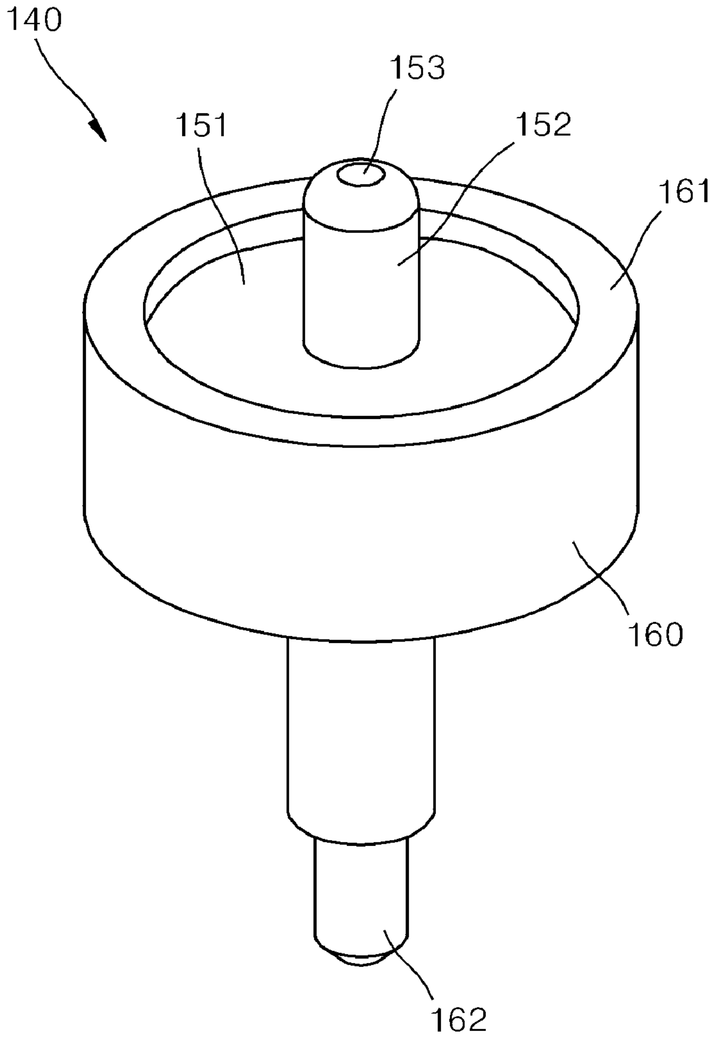
FIG. 9 is a perspective view illustrating a terminal portion among components of FIG. 7.

FIG. 7 is an exploded perspective view illustrating a cavity filter in accordance with a second embodiment of the present disclosure, FIG. 8 is a cross-sectional view illustrating the cavity filter in accordance with the second embodiment of the present disclosure, and FIG. 9 is a perspective view illustrating a terminal portion among components of FIG. 7.

As illustrated in FIGS. 7 to 9, a cavity filter 20 in accordance with the second embodiment of the present disclosure may include a terminal portion 140 having a first side terminal 150, a second side terminal 160 and an elastic member 180. The first side terminal 150 may be contacted with an electrode pad of an outer member 8, the second side terminal 160 may be fixed to the solder hole 32 formed in the plate of the RF signal connecting portion 31, and the elastic member 180 may be provided between the first side terminal 150 and the second side terminal 160 and elastically support the first side terminal 150 against an assembly force provided by an assembler.

Here, a lower end portion (see a locking support plate 151 to be described below) of the first side terminal 150 may be partially housed in the second side terminal 160. For this structure, an upper end portion of the second side terminal 160 may have a housing space which is recessed downward to house a part of the lower end portion of the first side terminal 150.

The first side terminal 150 may include the locking support plate 151 and an upper protrusion 152. The locking support plate 151 may be housed in the housing space of the second side terminal 160 and locked to the inside of the housing space of the second side terminal 160 so as to prevent the first side terminal 150 from being separated upward, and the upper protrusion 152 may protrude upward, by a predetermined length, from the top surface of the locking support plate 151, and have a contact portion 153 contacted with the electrode pad provided on the antenna board or PCB board 8.

The elastic member 180 may be provided on the bottom surface of the housing space of the second side terminal 160, and elastically support the bottom surface of the locking support plate 151 of the first side terminal 150 upward. The elastic member 180 provided as an electric deformable body serves to elastically support the first side terminal 150 such that portions (a plurality of support pieces which will be described below) for supporting the first side terminal 150 are radially widened or narrowed by the distance by which the first side terminal 150 is pressed downward by an assembly force of an assembler, thereby absorbing assembly tolerance existing in a terminal insertion port 25.

The elastic member 180 may be a washer spring which is formed in approximately the same shape as the star washer 90 described with reference to the first embodiment, and has a smaller size than the star washer 90. Therefore, the washer spring may include a ring-shaped fixed edge (with no reference numeral) which is fixed to a spring installation groove 164 which will be described below, and a plurality of support pieces (with no reference numeral) which are upwardly inclined toward the center of the bottom surface of the locking support plate 151 of the first side terminal 150 from the fixed edge.

Furthermore, as illustrated in FIG. 7, the housing space of the second side terminal 160 may include a top surface 161 which is recessed downward to house the locking support plate 151 of the first side terminal 150, and the spring installation groove 164 in which the fixed edge of the washer spring provided as the elastic member 180 is fixedly installed.

As illustrated in FIGS. 7 and 8, the cavity filter 20 in accordance with the second embodiment of the present disclosure may further include a dielectric body 170 inserted for impedance matching design in the terminal insertion port 25 in the relationship with the terminal portion 140 provided in the terminal insertion port 25. The dielectric body 170 may have a terminal through-hole 171 through which a lower end portion 162 of the second side terminal 160 passes.

In the cavity filter 20 in accordance with the second embodiment of the present disclosure, which has the above-described configuration, the washer spring serving as the elastic member 180 may absorb assembly tolerance existing between the antenna board or PCB 8 and the cavity filter 20, and simultaneously absorb assembly tolerance existing in the terminal insertion port 25.

Figure 10:
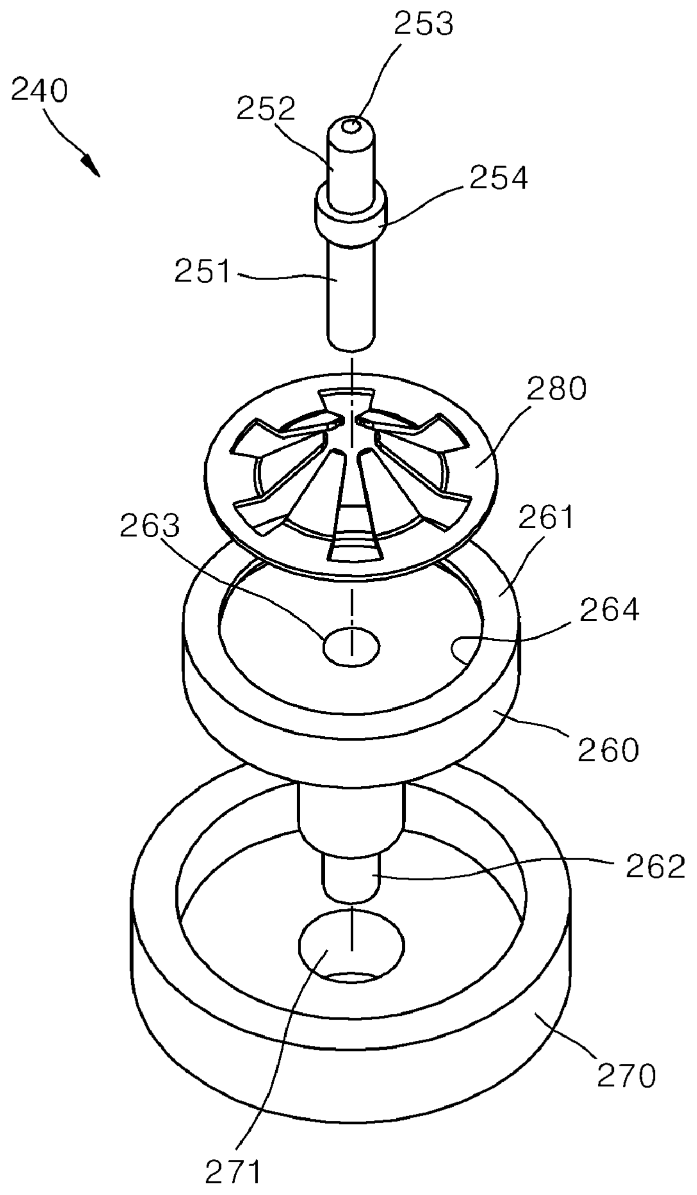
FIG. 10 is an exploded perspective view illustrating a cavity filter in accordance with a third embodiment of the present disclosure.
Figure 11:
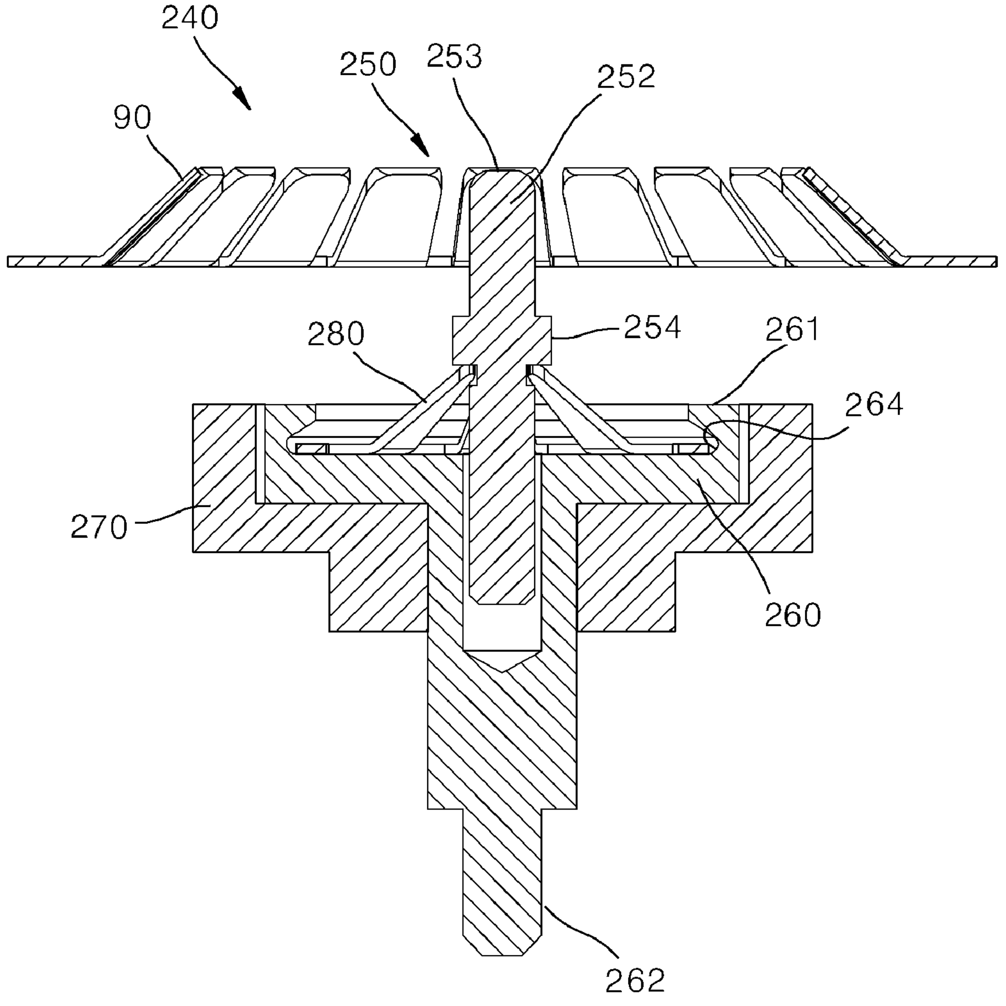
FIG. 11 is a cross-sectional view illustrating the cavity filter in accordance with the third embodiment of the present disclosure.
Figure 12:
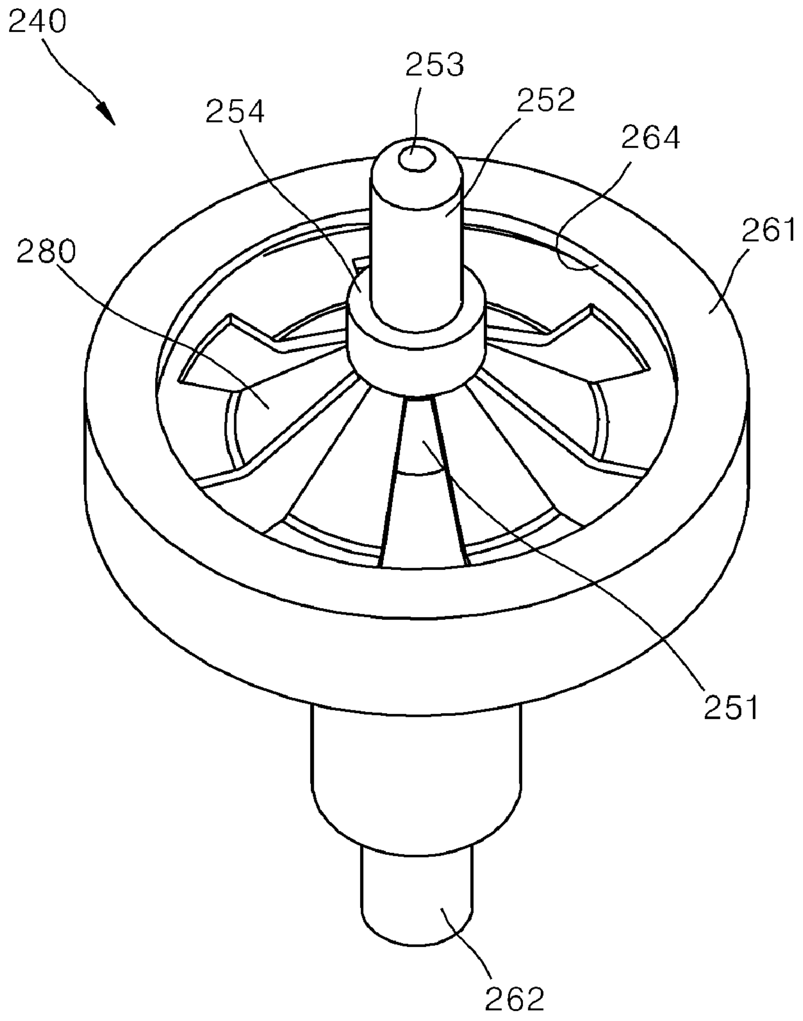
FIG. 12 is a perspective view illustrating a terminal portion among components of FIG. 10.

FIG. 10 is an exploded perspective view illustrating a cavity filter in accordance with a third embodiment of the present disclosure, FIG. 11 is a cross-sectional view illustrating the cavity filter in accordance with the third embodiment of the present disclosure, and FIG. 12 is a perspective view illustrating a terminal portion among components of FIG. 10.

As illustrated in FIGS. 10 to 12, a cavity filter 20 in accordance with the third embodiment of the present disclosure may include a terminal portion 240 having a first side terminal 250, a second side terminal 260 and an elastic member 280. The first side terminal 250 may be contacted with an electrode pad of an outer member 8, the second side terminal 260 may be fixed to a solder hole 32 formed in a plate of an RF signal connecting portion 31, and the elastic member 280 may be provided between the first side terminal 250 and the second side terminal 260 and elastically support the first side terminal 250 against an assembly force provided by an assembler.

Here, a lower end portion (see a lower protrusion 251 to be described below) of the first side terminal 250 may be partially housed in a terminal guide hole 263 formed in the second side terminal 260. For this structure, an upper end portion of the second side terminal 260 may have a housing space which is recessed downward to house a part of the lower end portion 251 of the first side terminal 250. Furthermore, the above-described terminal guide hole 263 may be formed at the bottom surface of the housing space of the second side terminal 260.

The first side terminal 250 may be housed in the housing space of the second side terminal 260, and include the lower protrusion 251 and an upper protrusion 252. The lower protrusion 251 may be inserted into the terminal guide hole 263 formed in the housing space of the second side terminal 260, and the upper protrusion 252 may have a contact portion 253 contacted with the electrode pad provided on the antenna board or PCB board 8.

Furthermore, as will be described below, the first side terminal 250 may further include a locking rib 254 formed between the lower protrusion 251 and the upper protrusion 252 so as to be locked to the elastic member 280 provided as a washer spring.

The elastic member 280 may be provided on the bottom surface of the housing space of the second side terminal 260, and elastically support the first side terminal 250 upward. The elastic member 280 provided as an electric deformable body serves to elastically support the first side terminal 250 such that portions (a plurality of support pieces which will be described below) for supporting the first side terminal 250 are radially widened or narrowed by the distance by which the first side terminal 250 is pressed downward by an assembly force of an assembler, thereby absorbing assembly tolerance existing in a terminal insertion port 25.

More specifically, the elastic member 280 may be provided as a washer spring as described above with reference to the second embodiment.

Therefore, the elastic member 280 may include a ring-shaped fixed edge (with no reference numeral) fixed to a spring installation groove 264 which will be described below, and a plurality of support pieces (with no reference numeral) which are upwardly inclined toward the locking rib 254 of the first side terminal 250 from the fixed edge.

Furthermore, as illustrated in FIG. 10, the housing space of the second side terminal 260 may include a top surface 261 which is recessed downward to house the lower protrusion 251 of the first side terminal 250, and the spring installation groove 264 in which the fixed edge of the washer spring provided as the elastic member 280 is fixedly installed.

In the cavity filter 20 in accordance with the third embodiment of the present disclosure, which has the above-described configuration, the first side terminal 250 and the second side terminal 260 are both made of a conductive material, and the washer spring serving as the elastic member 280, which is interposed between the first side terminal 250 and the second side terminal 260 and provides an elastic force, is also made of a conductive material. Thus, the cavity filter 20 does not require separate tension cut portions for applying lateral tension to prevent disconnection of an electric flow.

Since a dielectric body 270 inserted for impedance matching in the terminal insertion port 25 and the other components are configured in a similar manner to or the same manner as those of the cavity filter 20 in accordance with the second embodiment, the detailed descriptions thereof may be replaced with those of the second embodiment.

Figure 13:
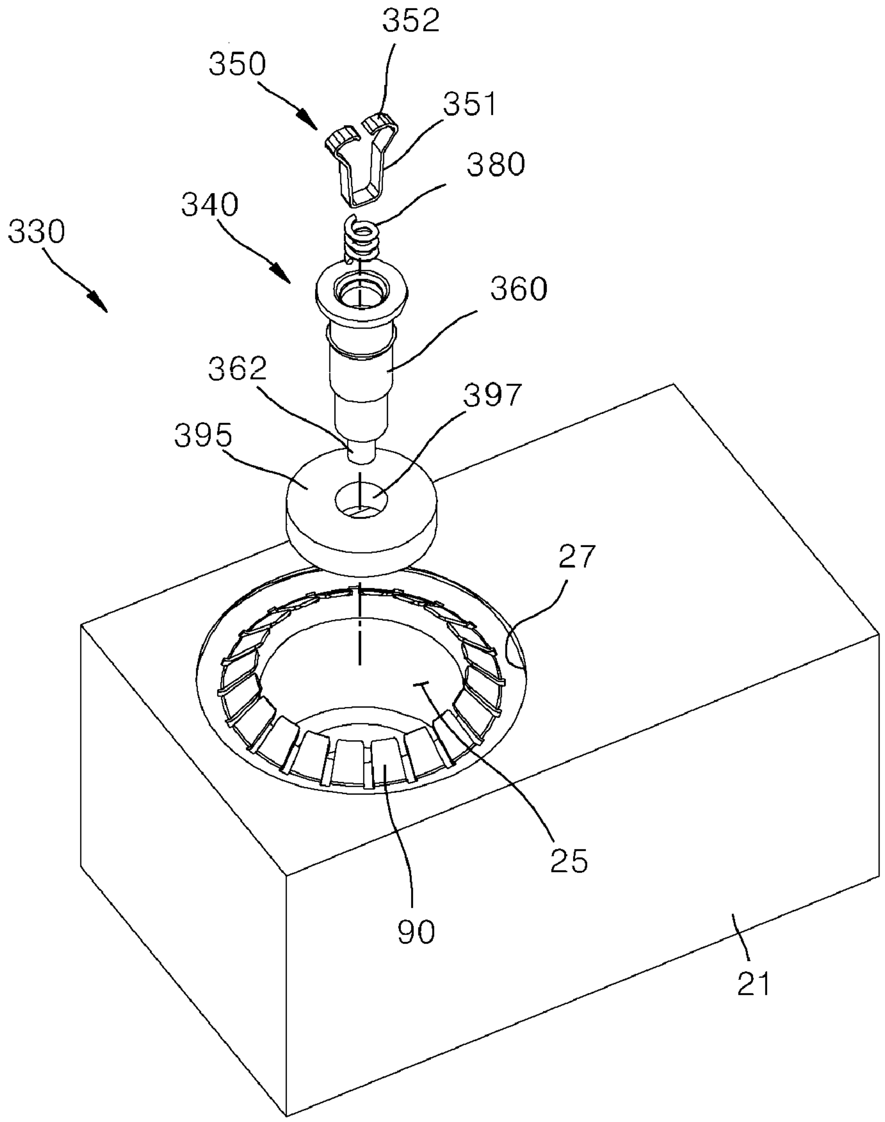
FIG. 13 is an exploded perspective view illustrating some components of a cavity filter in accordance with a fourth embodiment of the present disclosure.
Figure 14:
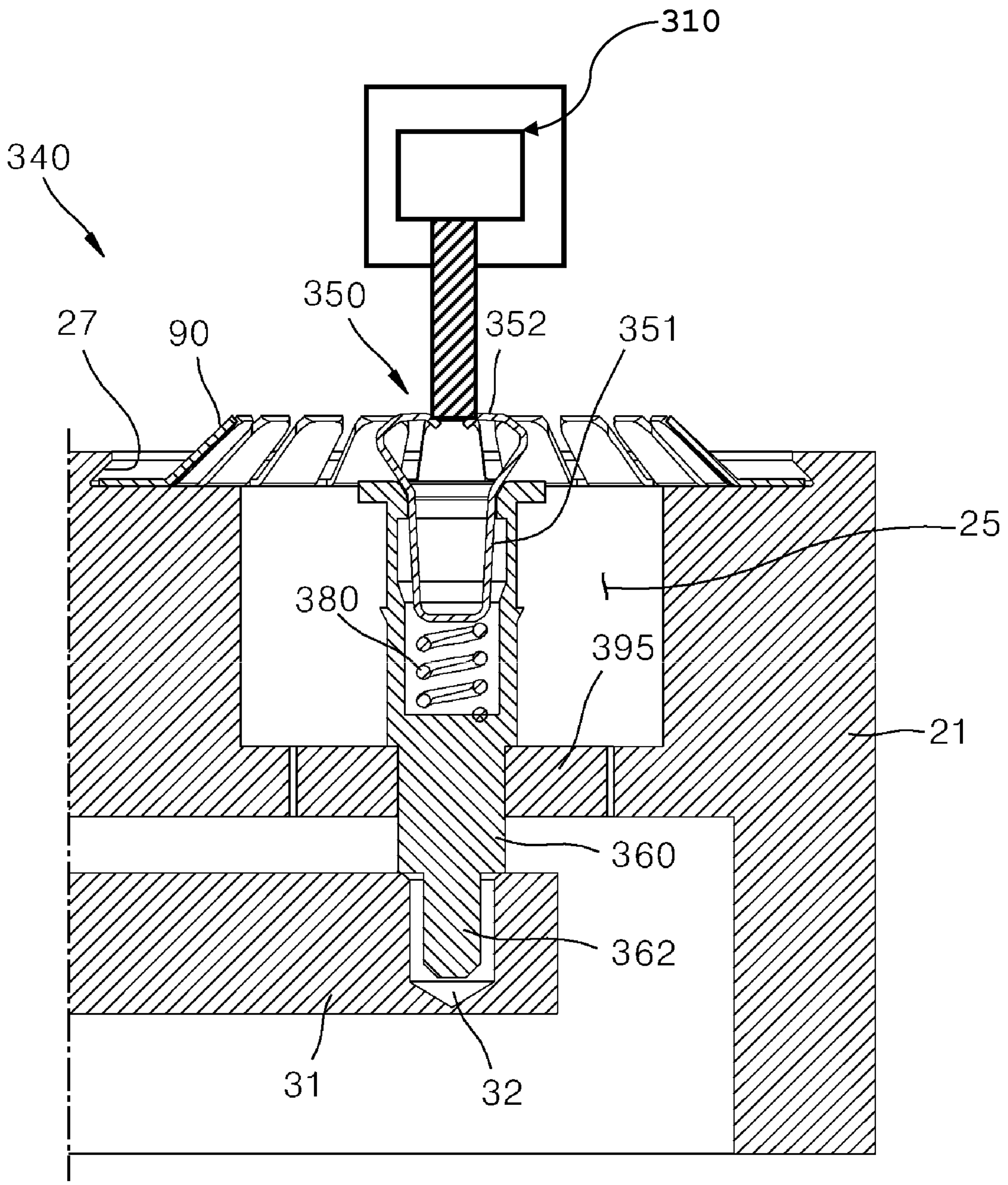
FIG. 14 is a cross-sectional view illustrating that a terminal portion is inserted and installed in a terminal insertion port among the components of FIG. 13.
Figure 15:
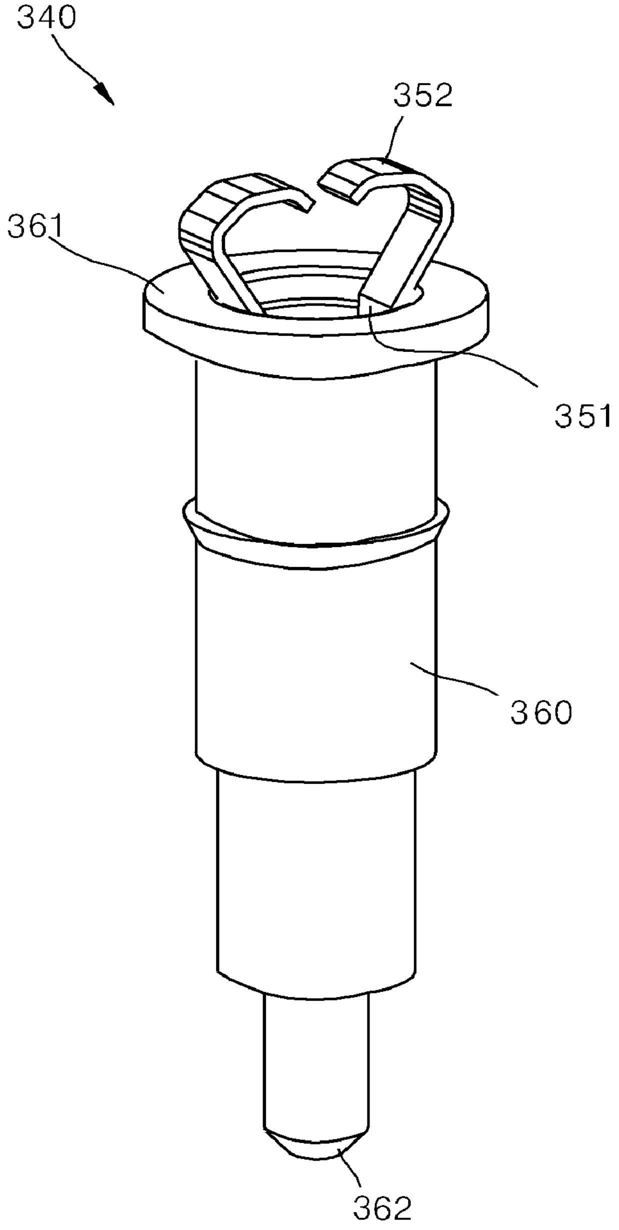
FIG. 15 is a perspective view illustrating the terminal portion among the components of FIG. 13.

FIG. 13 is an exploded perspective view illustrating some components of a cavity filter in accordance with a fourth embodiment of the present disclosure, FIG. 14 is a cross-sectional view illustrating that a terminal portion is inserted and installed into a terminal insertion port among the components of FIG. 13, and FIG. 15 is a perspective view illustrating the terminal portion among the components of FIG. 13.

As illustrated in FIGS. 13 to 15, a cavity filter 20 in accordance with the fourth embodiment of the present disclosure may include a terminal portion 340 having a first side terminal 350 and a second side terminal 360. The first side terminal 350 may be disposed at the top of a terminal insertion port 25, and contacted with an electrode pad 310 formed on one surface of an outer member 8 configured as any one of an antenna board and a PCB board. The second side terminal 360 may be disposed at the bottom of the terminal insertion port 25, have a terminal housing hole (with no reference numeral) in which a part of the lower end portion of the first side terminal 350 is housed and fixed, and be soldered and fixed to a solder hole 32 formed in the plate of an RF signal connecting portion 31.

The terminal portion 340 may further include an elastic member 380 housed in the terminal housing hole, and provided as a spring to elastically support the bottom surface 351 of the first side terminal 350 upward toward the outer member 8 configured as any one of an antenna board and a PCB board.

As illustrated in FIGS. 13 and 14, the first side terminal 350 may be bent approximately in a U-shape, and formed in a clip shape to have two contact surfaces formed at the top thereof. A contact portion 352 of the first side terminal 350, which has the two contact surfaces formed at the top thereof, may be bent in a round shape to minimize a contact area with the electrode pad 310.

As illustrated in FIGS. 13 and 14, the cavity filter 20 in accordance with the fourth embodiment of the present disclosure may further include a reinforcement plate 395 disposed in the terminal insertion port 25 and having a terminal through-hole 397 through which the second side terminal 360 passes.

Since the function of the reinforcement plate 395 has been already described in detail in the above-described embodiments, the detailed descriptions thereof will be omitted herein.

In the cavity filter 20 in accordance with the fourth embodiment of the present disclosure, the contact portion 352 of the first side terminal 350, which functions as an elastic deformable body, may be pressed downward by an assembly force provided by an assembler, and elastically deformed so as to be radially widened or narrowed to the outside. Furthermore, the contact portion 352 may be continuously and elastically supported toward the electrode pad 310 by the elastic member 380, and thus prevent a frequent decrease or increase in the contact area, which makes it possible to generate a stable electric flow.

Figure 16:
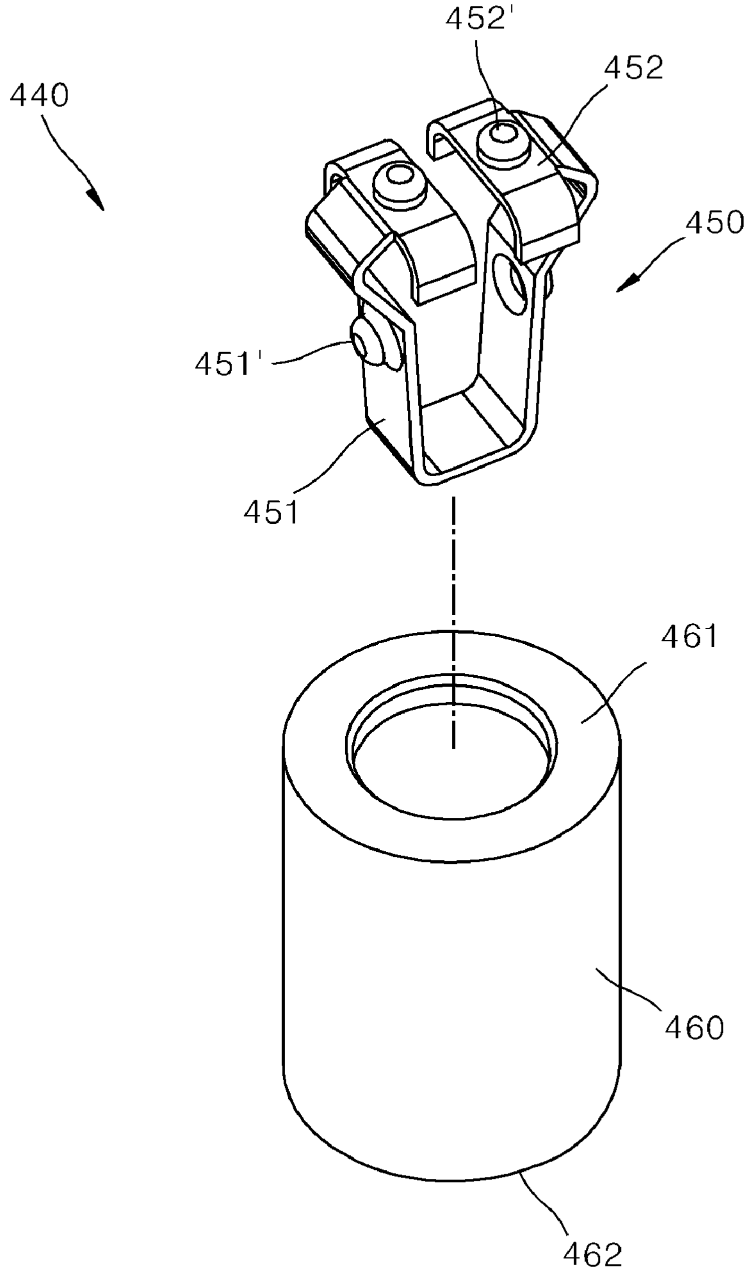
FIG. 16 is an exploded perspective view illustrating some components of a cavity filter in accordance with a fifth embodiment of the present disclosure.
Figure 17:
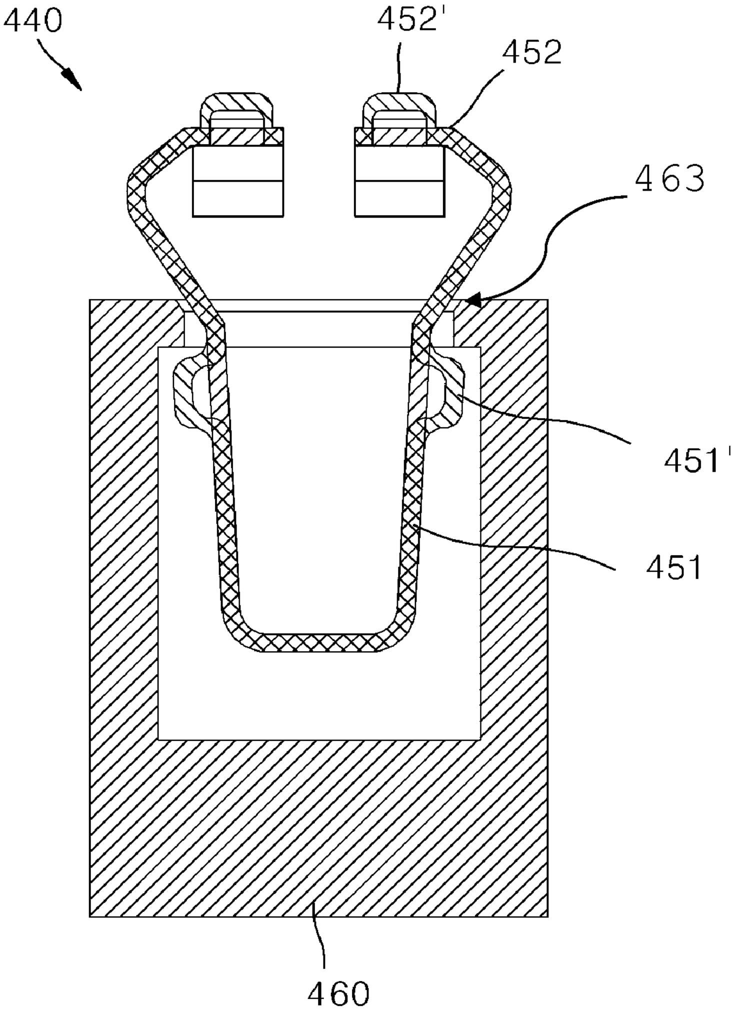
FIG. 17 is a cross-sectional view illustrating that a terminal portion is inserted and installed in a terminal insertion port among the components of FIG. 16.
Figure 18:
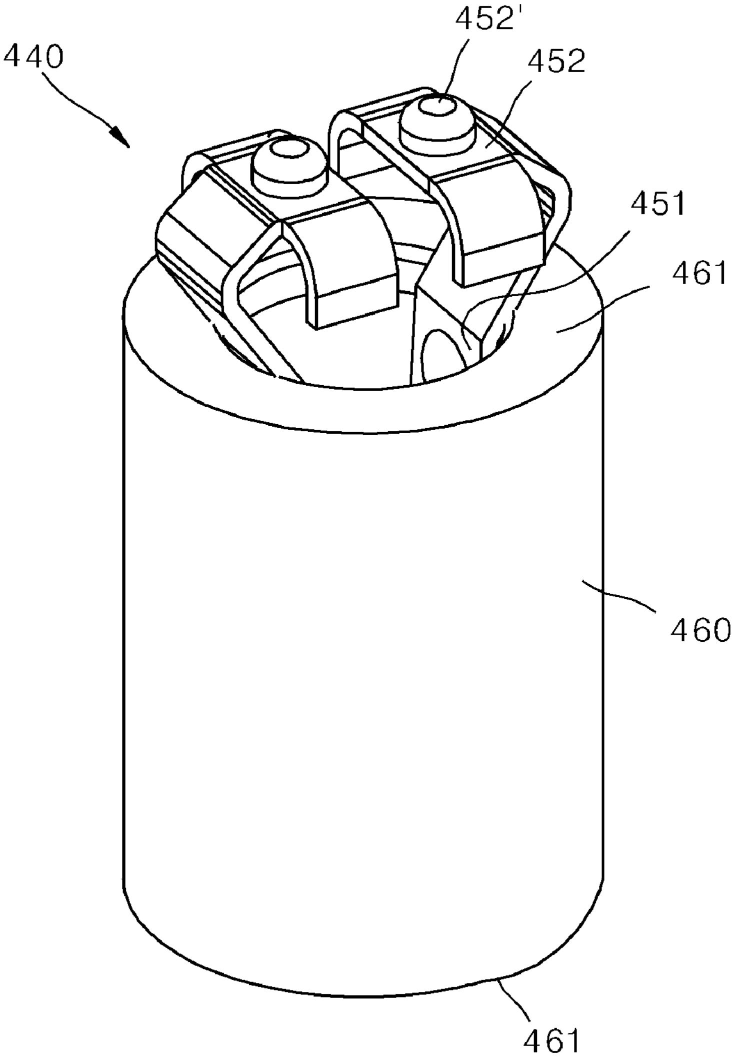
FIG. 18 is a perspective view illustrating the terminal portion among the components of FIG. 16.

FIG. 16 is an exploded perspective view illustrating some components of a cavity filter in accordance with a fifth embodiment of the present disclosure, FIG. 17 is a cross-sectional view illustrating that a terminal portion is inserted and installed into a terminal insertion port among the components of FIG. 16, and FIG. 18 is a perspective view illustrating the terminal portion among the components of FIG. 16.

As illustrated in FIGS. 16 to 18, a cavity filter 20 in accordance with the fifth embodiment of the present disclosure may include a terminal portion 440 having a first side terminal 450 and a second side terminal 460. The first side terminal 450 may be disposed at the top of a terminal insertion port 25, and contacted with an electrode pad (not shown) formed on one surface of an outer member 8 configured as any one of an antenna board and a PCB board. The second side terminal 460 may be disposed at the bottom of the terminal insertion port 25, have a terminal housing hole (with no reference numeral) in which a part of a lower end portion of the first side terminal 450 is housed and fixed, and be soldered and fixed to a solder hole 32 formed in a plate of an RF signal connecting portion 31.

In the cavity filter 20 in accordance with the fifth embodiment of the present disclosure, the first side terminal 450 may further include a contact protrusion 452' and a separation prevention protrusion 451', compared to the above-described cavity filter 20 in accordance with the fourth embodiment. The contact protrusion 452' protrudes upwardly from each of contact surfaces of two contact portions 452, and the separation prevention protrusion 451' protrudes from either side surface 451 of the first side terminal 450 so as to be locked into the terminal housing hole of the second side terminal 460 by a locking ridge 463.

The contact protrusion 452' serves to standardize a contact area of the contact portion 452 with respect to the electrode pad (not shown) formed on one surface of the outer member 8 configured as any one of an antenna board and a PCB board. Therefore, the contact area may be constantly maintained as long as the first side terminal 450 is contacted with the electrode pad (not shown) while elastically supported by an elastic member 480 among the components of the cavity filter 20 in accordance with the fifth embodiment.

Since the other components have the same configuration as those of the cavity filter 20 in accordance with the fourth embodiment, the detailed descriptions thereof may be replaced with those of the fourth embodiment.

Figure 19:
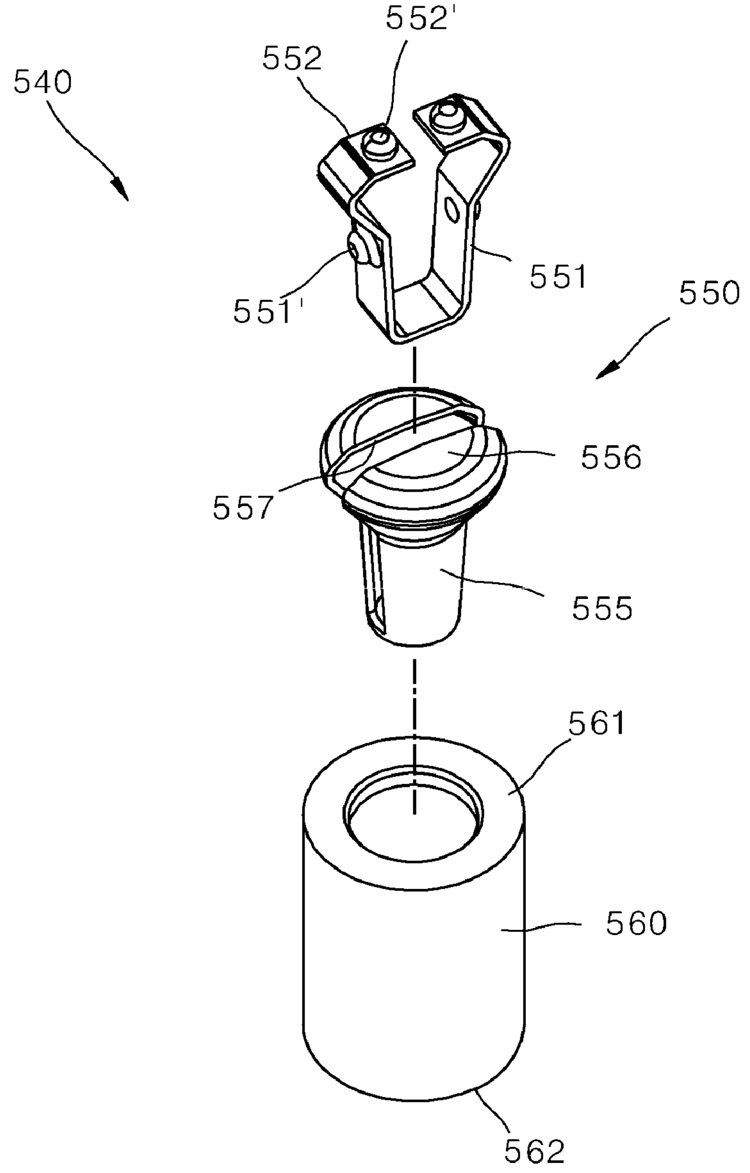
FIG. 19 is an exploded perspective view illustrating some components of a cavity filter in accordance with a sixth embodiment of the present disclosure.
Figure 20:
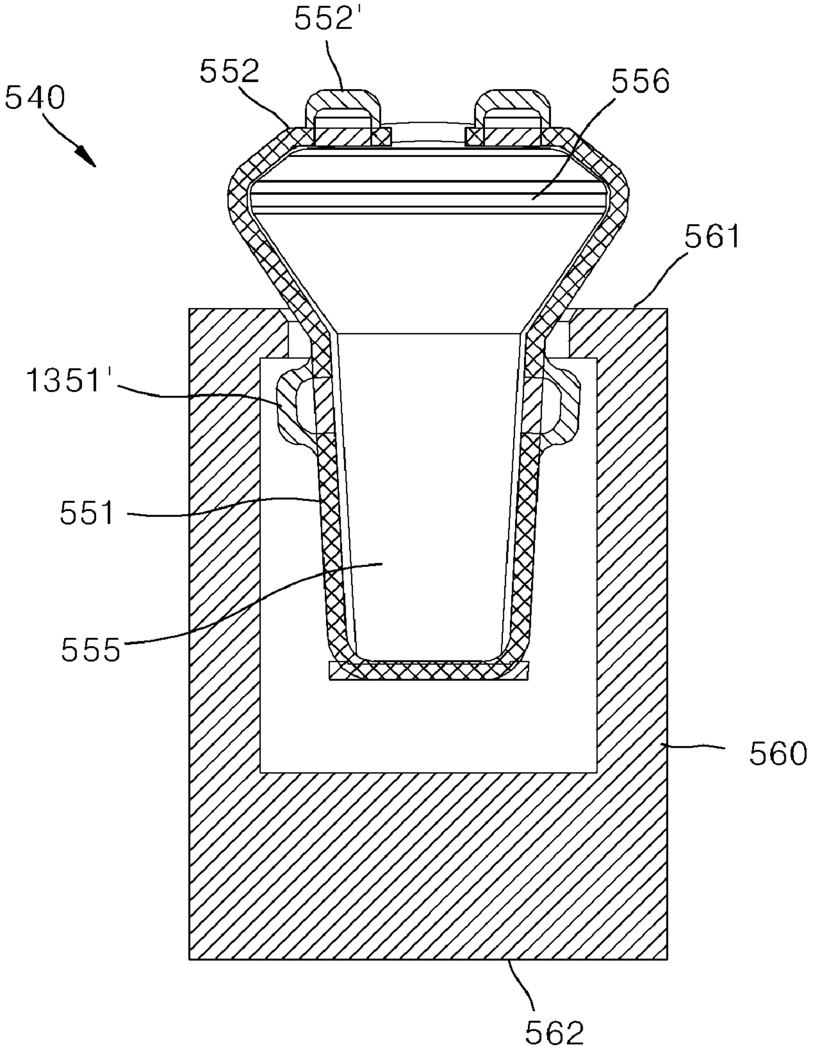
FIG. 20 is a cross-sectional view illustrating that a terminal portion is inserted and installed in a terminal insertion port among the components of FIG. 19.
Figure 21:
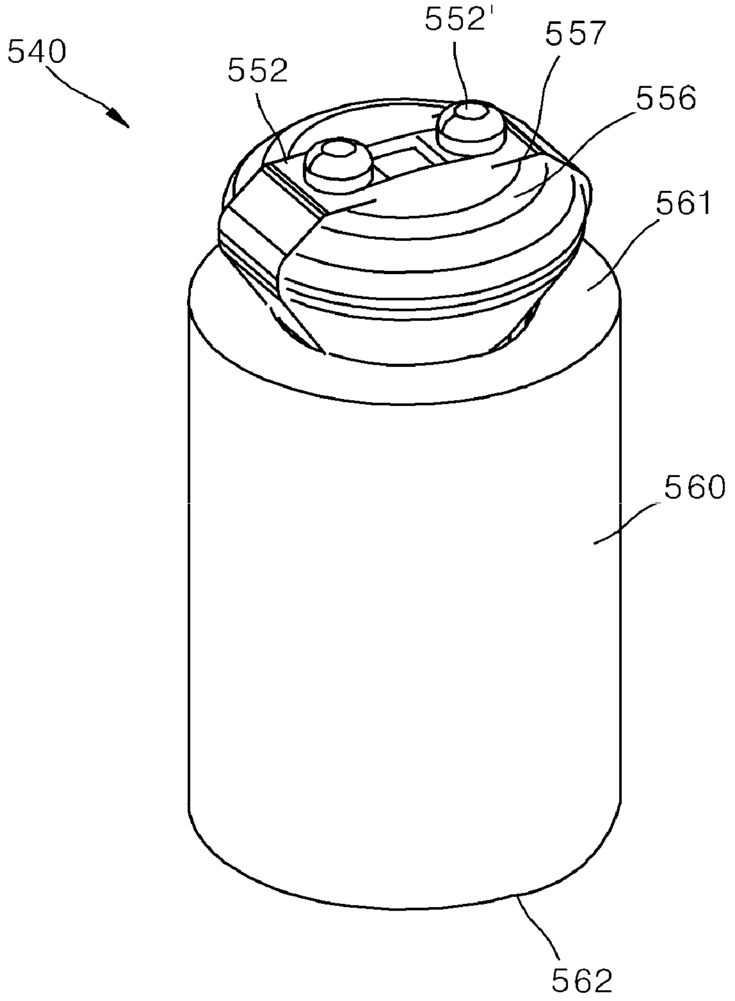
FIG. 21 is a perspective view illustrating the terminal portion among the components of FIG. 19.

FIG. 19 is an exploded perspective view illustrating some components of a cavity filter in accordance with a sixth embodiment of the present disclosure, FIG. 20 is a cross-sectional view illustrating that a terminal portion is inserted and installed into a terminal insertion port among the components of FIG. 19, and FIG. 21 is a perspective view illustrating the terminal portion among the components of FIG. 19.

As illustrated in FIGS. 19 to 21, a cavity filter 20 in accordance with the fifth embodiment of the present disclosure may include a terminal portion 540 having a first side terminal 550 and a second side terminal 560. The first side terminal 550 may be disposed at the top of a terminal insertion port 25, and contacted with an electrode pad (not shown) formed on one surface of an outer member 8 configured as any one of an antenna board and a PCB board. The second side terminal 560 may be disposed at the bottom of the terminal insertion port 25, have a terminal housing hole (with no reference numeral) in which a part of the lower end portion of the first side terminal 550 is housed and fixed, and be soldered and fixed to a solder hole 32 formed in the plate of an RF signal connecting portion 31.

In the cavity filter 20 in accordance with the sixth embodiment of the present disclosure, the first side terminal 550 may further include a contact protrusion 552' and a separation prevention protrusion 552', like the above-described cavity filter 20 in accordance with the fifth embodiment. The contact protrusion 552' protrudes upwardly from each of contact surfaces of two contact portions 552, and the separation prevention protrusion 551' protrudes from either side surface 551 of the first side terminal 550 so as to be locked into the terminal housing hole of the second side terminal 560

The cavity filter 20 in accordance with the sixth embodiment of the present disclosure may further include a separation prevention housing 555 housed in a terminal housing hole of the second side terminal 560 and configured to house the first side terminal 550 therein and prevent the first side terminal 550 from being separated to the outside.

The separation prevention housing 555 may have a guide groove 557 which is cut in such a manner that the contact protrusion 552' and the separation prevention protrusion 551' of the first side terminal 550 among the components of the cavity filter in accordance with the sixth embodiment protrude to the outside.

The contact protrusion 552' of the first side terminal 550 may protrude from the top 556 of the guide groove 557 so as to be contacted with the electrode pad (not shown), and the separation prevention protrusion 551' of the first side terminal 550 may also protrude from the left/right side of the guide groove 557 so as to be locked to the inside of the terminal housing hole.

The separation prevention housing 555 has an internal space in which the first side terminal 550 is housed, and serves to protect the first side terminal 550 such that the first side terminal 550 is not excessively deformed beyond a yield point when elastically deformed by an assembly force provided by an assembler, the yield point indicating the limit point where the first side terminal 550 is elastically restored to the original state.

Since the other components have the same configuration as those of the cavity filter 20 in accordance with the fifth embodiment, the detailed descriptions thereof may be replaced with those of the fifth embodiment.

Figure 22:
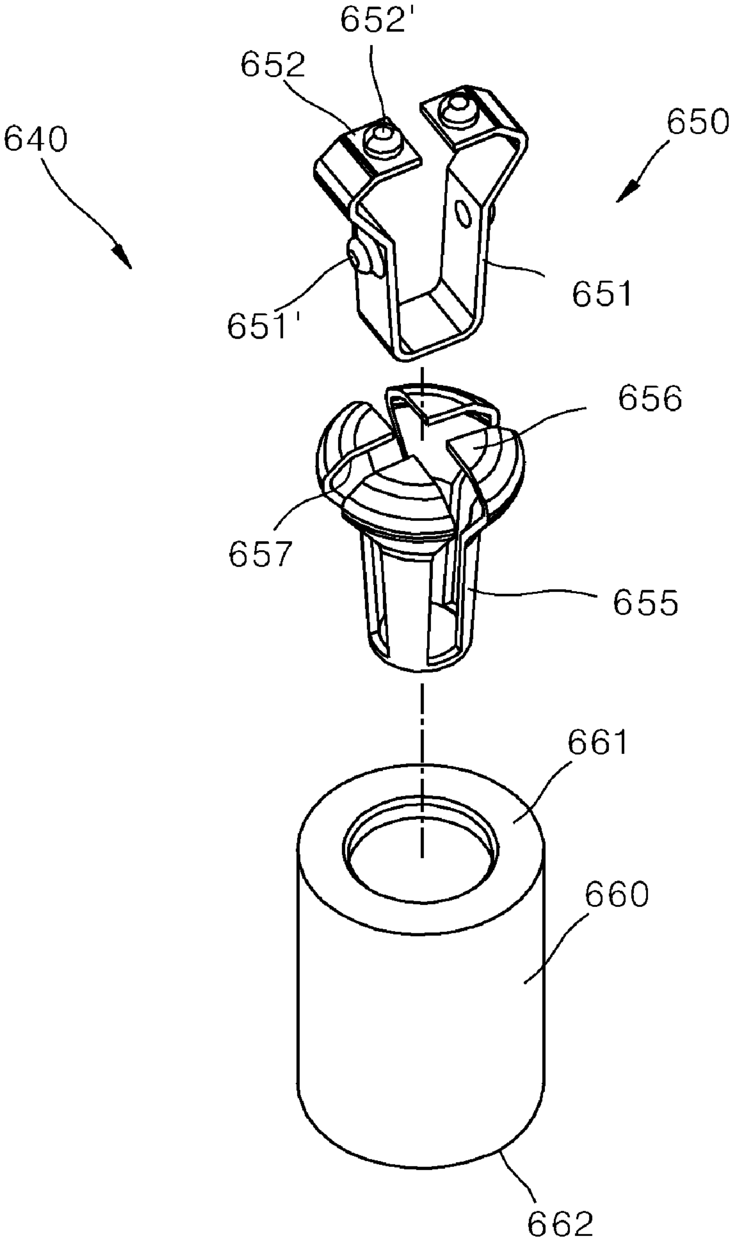
FIG. 22 is an exploded perspective view illustrating some components of a cavity filter in accordance with a seventh embodiment of the present disclosure.
Figure 23:
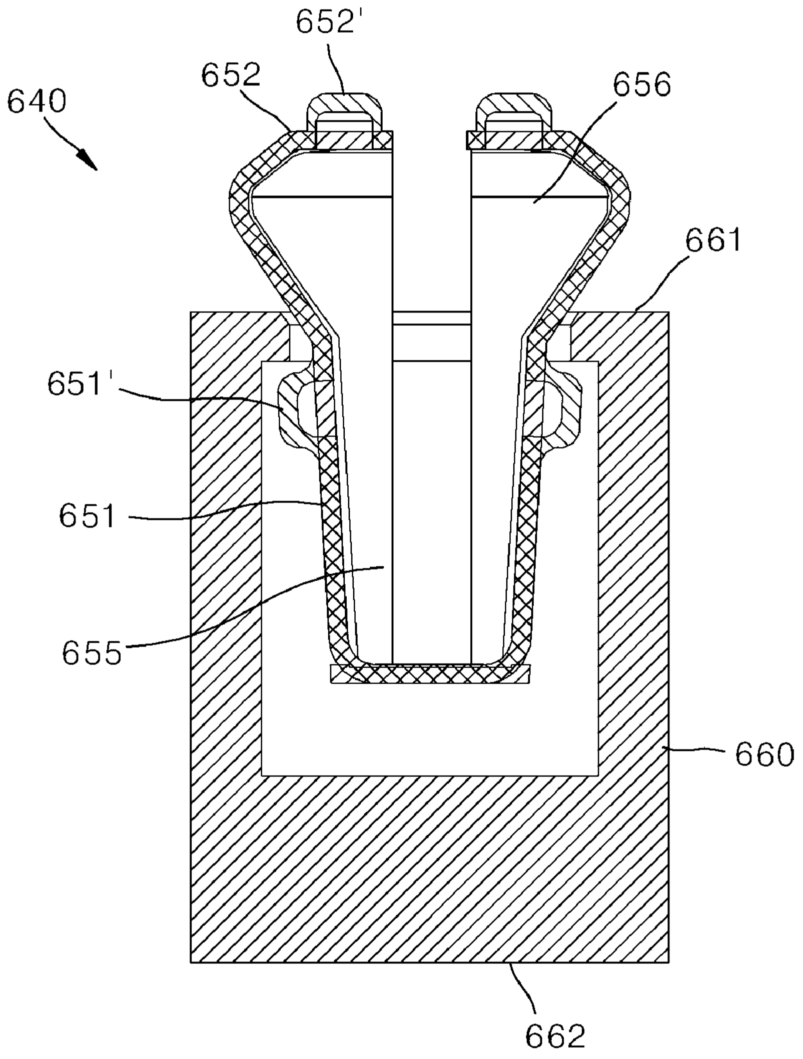
FIG. 23 is a cross-sectional view illustrating that a terminal portion is inserted and installed in a terminal insertion port among the components of FIG. 22.
Figure 24:
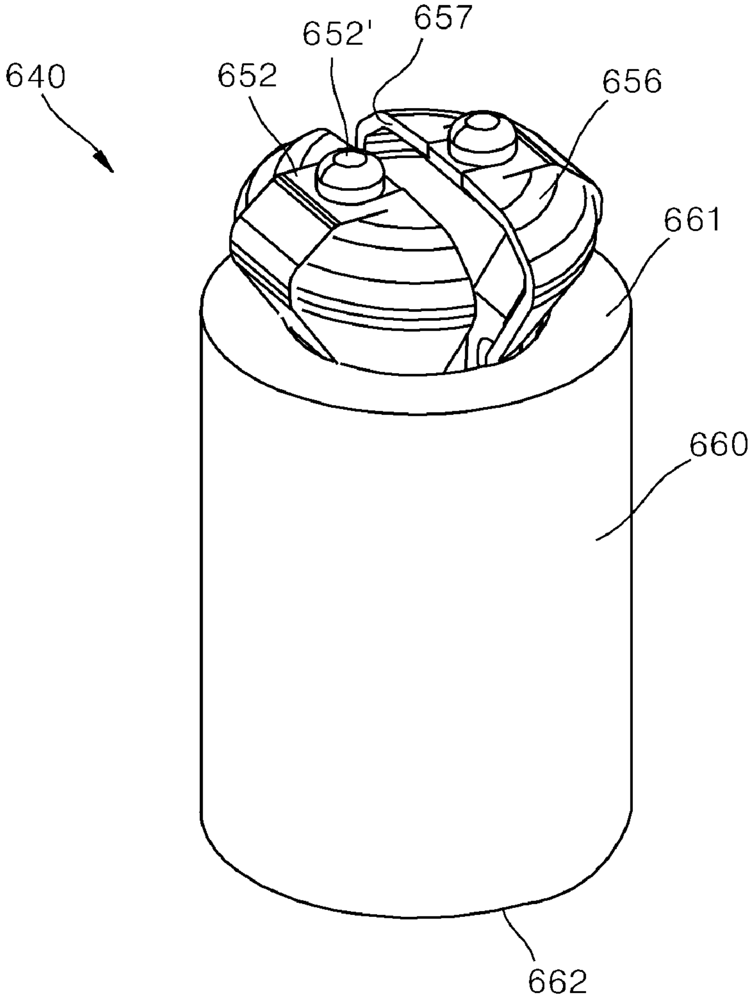
FIG. 24 is a perspective view illustrating the terminal portion among the components of FIG. 22.

FIG. 22 is an exploded perspective view illustrating some components of a cavity filter in accordance with a seventh embodiment of the present disclosure, FIG. 23 is a cross-sectional view illustrating that a terminal portion is inserted and installed into a terminal insertion port among the components of FIG. 22, and FIG. 24 is a perspective view illustrating the terminal portion among the components of FIG. 22.

As illustrated in FIGS. 22 to 24, a cavity filter 20 in accordance with the seventh embodiment of the present disclosure may include a guide groove 657 formed in a separation prevention housing 655 and provided in a '+' shape, in addition to the components of the cavity filter 20 in accordance with the sixth embodiment of the present disclosure.

In the terminal portion 540 of the cavity filter 20 in accordance with the sixth embodiment, the guide groove 557 of the separation prevention housing 555 may be cut in a '--' shape. However, in a terminal portion 640 of the cavity filter 20 in accordance with the seventh embodiment, the guide groove 657 may be cut in a '+' shape and formed in the separation prevention housing 655, thereby applying a predetermined elastic restoring force by an external force to the separation prevention housing 655.

Since the other components have the same configuration as those of the cavity filter 20 in accordance with the sixth embodiment, the detailed descriptions thereof may be replaced with those of the sixth embodiment.

Figure 25:
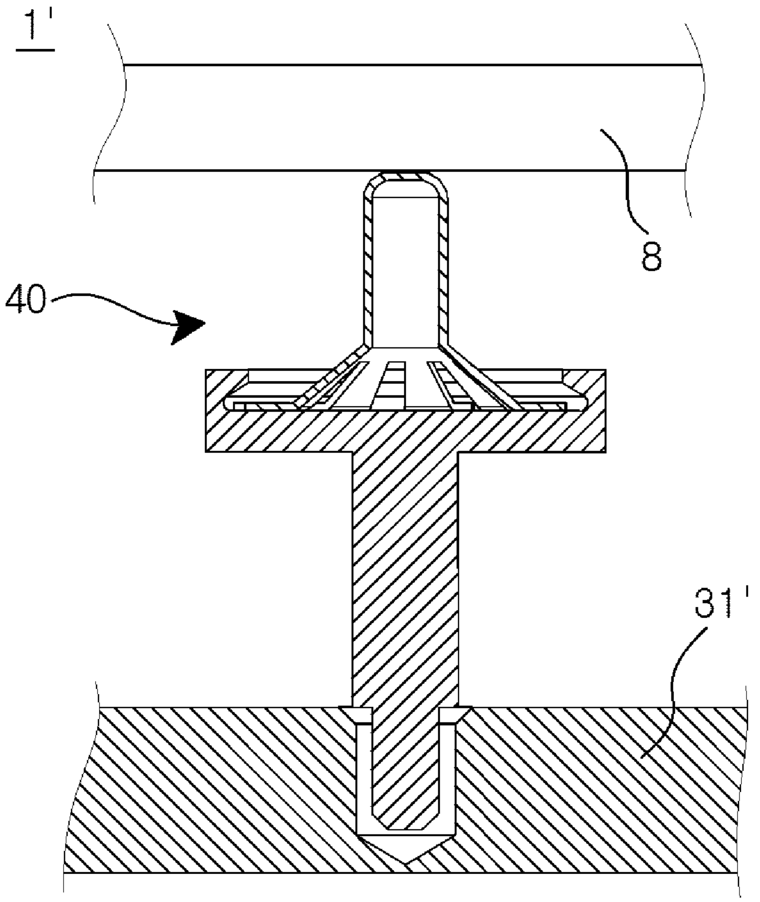
FIG. 25 is a cross-sectional view illustrating a connecting structure in accordance with an embodiment of the present disclosure.

FIG. 25 is a cross-sectional view illustrating a connecting structure in accordance with an embodiment of the present disclosure.

So far, it has been described that each of the cavity filters in accordance with the various embodiments of the present disclosure is manufactured as one module, and attached to one surface of the outer member 8 provided as an antenna board or a PCB board. However, the embodiments of the present disclosure are not necessarily limited thereto. According to a modification illustrated in FIG. 25, the cavity filter may be implemented as a connecting structure 1' including the terminal portion 40 which is provided between the electrode pad (not shown) provided on one surface of the outer member 8 and another connection member 31', and makes an electric connection with the connection member 31', regardless of whether the cavity filter is manufactured in the form of a module.

The above-described contents are only exemplary descriptions of the technical idea of the present disclosure, and those skilled in the art to which the present disclosure pertains may change and modify the present disclosure in various manners without departing from the essential properties of the present disclosure.

Therefore, the embodiments disclosed in the present disclosure do not limit but describe the technical idea of the present disclosure, and the scope of the technical idea of the present disclosure is not limited by the embodiments. The scope of the protection of the present disclosure should be construed by the following claims, and all technical ideas within a range equivalent to the claims should be construed as being included in the scope of rights of the present disclosure.

INDUSTRIAL APPLICABILITY

The present disclosure provides a cavity filter which can have a slimmer and more compact structure because an RF connector is embedded in the filter body in the thickness direction thereof, be assembled through an assembly method capable of minimizing the accumulation amount of assembly tolerance which occurs when a plurality of filters are assembled, facilitate the RF signal connection structure to be easily mounted and uniformly maintain the frequency characteristics of the filters, and provide stable connection by applying lateral tension while allowing a relative motion, thereby preventing degradation in antenna performance, and a connecting structure included therein.

What is claimed is:

1. A cavity filter comprising:

a filter body;

a terminal insertion port provided in the filter body; and a terminal portion, provided in the terminal insertion port, and is configured to electrically connect an electrode pad, provided above the filter body, to an RF (radiofrequency) signal connector which is spaced apart from the electrode pad and provided below the terminal portion, wherein the terminal portion comprises:

a first terminal in contact with the electrode pad; and a second terminal having a recess, and is connected to the RF signal connector, wherein the first terminal comprises at least one bent portion which is deformable in response to an assembly force, and wherein at least a part of the first terminal is housed in the recess of the second terminal.

2. The cavity filter of claim 1, wherein the terminal portion further comprises an elastic member housed in the recess, wherein a top of the elastic member is in contact with a bottom surface of the first terminal and a bottom of the elastic member is in contact with a surface of the recess.

3. The cavity filter of claim 2, wherein the elastic member comprises a coil-type spring.

4. The cavity filter of claim 2, wherein the elastic member comprises a spring to elastically support the bottom surface of the first terminal upward toward the electrode pad.

5. The cavity filter of claim 1, wherein the first terminal comprises an elongated piece which is bent approximately in a U-shape, and formed in a clip shape to have a contact portion having at least two bent portions, including the bent portion, each of which being bent in a round shape.

6. The cavity filter of claim 5, wherein the at least two bent portions are bent toward a center of the first terminal such that the assembly force exerted to the at least two bent portions causes the at least two bent portions to be radially widened or narrowed.

7. The cavity filter of claim 1, further comprising a reinforcement plate disposed in the terminal insertion port and having a terminal through-hole, wherein the second terminal comprises an upper portion having a first diameter and a lower portion having a second diameter, wherein the terminal through-hole has a third diameter, wherein the third diameter is smaller than the first diameter, so that the reinforcement plate supports a bottom surface of the upper portion of the second terminal and the lower portion of the second terminal passes through the terminal through-hole.

8. The cavity filter of claim 1, wherein the first terminal further comprises at least two contact protrusions protruding upwardly from the contact portion.

9. The cavity filter of claim 8, wherein the first terminal comprises at least two separation prevention protrusions protruding in opposite directions from side surfaces of the first terminal, and the second terminal comprises a locking ridge protruding along a top surface of the recess so that the first terminal is locked by the locking ridge.

10. The cavity filter of claim 9, further comprising a separation prevention housing housed in the recess of the second terminal and is configured to house the first terminal.

11. The cavity filter of claim 10, wherein the separation prevention housing comprises a guide groove which is cut such that the at least two contact protrusions and the at least two separation prevention protrusions protrude from the separation prevention housing.

* * * * *